United States Patent
Matsushita

(10) Patent No.: US 7,438,429 B2
(45) Date of Patent: Oct. 21, 2008

(54) PLANAR LIGHTING DEVICE WITH TRANSMITTANCE ADJUSTER AND LIQUID CRYSTAL DISPLAY DEVICE USING THE SAME

(75) Inventor: Motohiko Matsushita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 136 days.

(21) Appl. No.: 11/643,801

(22) Filed: Dec. 22, 2006

(65) Prior Publication Data

US 2007/0147023 A1 Jun. 28, 2007

(30) Foreign Application Priority Data

Dec. 22, 2005 (JP) ............... 2005-369612

(51) Int. Cl.
*G09F 13/04* (2006.01)
*G02F 1/1335* (2006.01)

(52) U.S. Cl. ............... 362/97; 362/29; 349/64

(58) Field of Classification Search ............ 362/29, 362/30, 97, 561; 349/64
See application file for complete search history.

(56) References Cited

U.S. PATENT DOCUMENTS 6,561,663 B2 * 5/2003 Adachi et al. ............ 362/616
6,874,900 B2 * 4/2005 Hsieh ............ 362/26
6,880,947 B2 * 4/2005 Hsieh et al. ............ 362/614
7,059,736 B2 * 6/2006 Yu et al. ............ 362/97
7,307,676 B2 * 12/2007 Jeon ............ 349/64

FOREIGN PATENT DOCUMENTS

| JP | 05-127156 A | 5/1993 |
|---|---|---|
| JP | 06-235825 A | 8/1994 |
| JP | 2001-042327 A | 2/2001 |

* cited by examiner

*Primary Examiner*—Sandra O'Shea
*Assistant Examiner*—James W Cranson
(74) *Attorney, Agent, or Firm*—Sughrue Mion, PLLC

(57) ABSTRACT

The planar lighting device includes rod type light sources, a light guide plate having light guide plate blocks, each being formed of an integral assembly of at least two light guide plate units each having a rear surface with a groove formed to accommodate a rod type light source and a light exit surface that is away from the rear surface and which is for emitting the light from the light source and a transmittance adjuster unit that is provided on a side closer to the light exit surface, and which has a sheet type optical member capable of transmitting light and transmittance adjusters provided on at least one surface of the optical member. The transmittance adjusters at a position corresponding to a seam between adjacent light guide plate blocks are distributed at a different density than the transmittance adjusters at a position corresponding to a joint between adjacent light guide plate units.

13 Claims, 10 Drawing Sheets

PLANAR LIGHTING DEVICE WITH TRANSMITTANCE ADJUSTER AND LIQUID CRYSTAL DISPLAY DEVICE USING THE SAME

TECHNICAL FIELD

The entire contents of the documents cited in this specification are incorporated herein by reference.

The present invention relates to a planar lighting device for causing uniform planar light to be emitted from a light exit surface, and a liquid crystal display device using the same.

BACKGROUND ART

A liquid crystal display device is provided with a backlight unit for irradiating a liquid crystal panel (LCD) with light from its rear side and illuminating the liquid crystal panel. The backlight unit includes an illuminating light source, a light guide plate that diffuses light emitted from the light source to irradiate the liquid crystal panel with the light, a prism sheet or diffusion sheet for equalizing the light emitted from the light guide plate and other such components.

A known example of such backlight unit is disclosed in JP 9-304623 A.

FIG. 20 is a schematic sectional view of an area light source device disclosed in JP 9-304623 A.

The area light source device (backlight unit) shown in FIG. 20 is formed by embedding fluorescent lamps 102 in a light guide plate 100, then arranging a reflective sheet 104 on a rear surface of the light guide plate 100 and laminating a transmitted light amount correction sheet 106, a light diffuser 108, and a prism sheet 110 on a light exit surface of the light guide plate 100.

The light guide plate 100 has a substantially rectangular shape and is made of a resin into which fine particles functioning to diffuse illumination light are dispersed. Also, the light guide plate 100 has a flat upper surface, which is used as the light exit surface. Further, grooves 100a each having a U shape in section are formed in the rear surface (surface opposite to the light exit surface) of the light guide plate 100. The fluorescent lamps 102 are fitted into their respective grooves. A light amount correction surface 100b for promoting the emission of illumination light is formed on the light exit surface of the light guide plate 100, except in portions just above the fluorescent lamps 102.

As mentioned above, JP 9-304623 A describes that, the fine particles are mixed into the resin to form the light guide plate 100 and in addition, the illumination light is promoted to exit by the light amount correction surface 100b formed on a part or all of the light exit surface except in the portions just above the fluorescent lamps 102, making it possible to reduce the total thickness and the unnatural unevenness in luminance of the light emitted from the light guide plate 100.

For the purpose of obtaining a backlight for a liquid crystal display device, which enables reduction in size, weight, and thickness of the liquid crystal display device as well as reduction in cost and power consumption without reducing the illumination amount of the backlight, JP 8-62426 A discloses a light guide plate having a rectangular illumination surface, a groove rectangular in section which is gouged out at a central portion with respect to the short sides in parallel with the long sides and in which a light source is inserted, and a rear surface formed such that a plate thickness is gradually reduced from the groove toward both lateral surfaces on the long sides.

In addition, for the purpose of obtaining a backlight unit that enables a thin frame and reduction of the total thickness of a liquid crystal display device and which is bright with high use efficiency, JP 10-133027 A discloses a light guide member (light guide plate) having a parabolic shape in section along the width direction of a concave portion where the light source is arranged, with the depth direction being a major axis.

In backlight units using those light guide plates, luminance distributions involving bright and dark lines are produced, so a variety of methods have been proposed for improving them (see, for example, JP 5-127156 A, JP 6-235825 A, and JP 2001-42327 A).

JP 5-127156 A describes a liquid crystal display device having a dotted area printed on a surface of a diffuser plate in order to block light transmission. The reference also states that by making the printed dots dense in the region where a cold cathode fluorescent lamp is positioned right beneath while making them less dense with the increasing distance from that region, whereby the quantity of light emitted toward the diffuser plate becomes uniform as it reaches every part of the plate.

JP 6-235825 A describes a light guide plate in which a light scattering layer is formed on the underside of the plate member in such a way that its area percentage increases with the increasing distance from a linear light source. The reference states that the light scattering layer is used to ensure that the light within the plate member of the light guide plate is picked up from the topside in response to a change in luminance from the linear light source.

JP 2001-42327 A describes a light guide plate having a transmission adjusting means which is formed as a density-modulated dot pattern that is printed in highly reflective ink to provide a strip in a longitudinal direction of a transparent substrate in such a way that the increase in luminance due to direct incidence of light from a linear light source is suppressed by inversely counteracting the quantity of that light, said density-modulated dot pattern being formed by decreasing the dot area or the number of dots from the lateral side of said projecting edge inward of the light exit plane.

As a result, the light from the linear light source is reflected by each projecting edge to reach the transmission adjusting means formed on the light emerging plane of its surface, whereupon the density modulation by that adjusting means adjusts the amount of transmission and that of anti-transmission in such a way that they both increase gradually from the lateral side of each projecting edge inward of the light exit plane, so that the increase in luminance that occurs at the area where the linear light source is provided on account of direct incidence of the light from the linear light source is suppressed to ensure uniformity in the irradiation luminance of the light guided by said light guiding means.

JP 2004-170698 A describes a light diffusing sheet as an optical member that is to be used in a backlight unit for a liquid crystal display device, the sheet having printed thereon a luminance distribution reversed image which is formed by gradation reversal of the data obtained by measuring at least the luminance distribution on the light exit surface of the backlight unit.

The luminance distribution reversed image has a gradation pattern of high precision that reflects the luminance distribution on the light exit surface of the backlight unit, so the light that has passed through the light diffusing sheet after emerging from the light guide plate has such a small degree of unevenness in luminance that it is free from the occurrence of bright lines.

SUMMARY OF THE INVENTION

In order to fabricate large planar lighting devices to be used with widescreen liquid crystal televisions and monitors, it is necessary to prepare large-size light guide plates. However, the dimensions of light guide plates that can be prepared are limited because of the dimensional constraints on the molds for making them. To deal with this problem, manufacturers are adopting a process in which a plurality of light guide plate blocks each made from a single mold are connected to prepare one larger light guide plate, which is employed to construct a planar lighting device. However, in this planar lighting device constructed using the large-size light guide plate, the brightness of the joint between adjacent light guide plate blocks varies from the brightness of other portions, causing the joint to be perceived as either bright or dark lines.

In order to suppress the generation of bright lines from a linear light source, the present inventors filed Japanese Patent Application No. 2004-258340 in which they disclosed a transmittance adjuster unit comprising transmittance adjusters that are arranged at a specified pattern density on a transparent film. By using this transmittance adjuster unit, light emerging from the light exit surface of the light guide plate can be rendered more uniform and less uneven in brightness.

The present invention has been accomplished under these circumstances and has as an object providing a planar lighting device comprising a plurality of connected light guide plate units, in which no bright or dark lines will be perceived in a region corresponding to the joint between adjacent light guide plate units, thereby assuring that a wide enough range can be illuminated with light in the absence of any unevenness in brightness.

Another object of the present invention is to provide a liquid crystal display device that may be in a large size but which yet produces uniform light having a sufficiently smaller degree of unevenness in brightness to be capable of displaying image of good quality.

In order to attain the first object described above, the first aspect of the present invention provides a planar lighting device, comprising: rod type light sources; a light guide plate comprising light guide plate blocks that are arranged side by side and each of which is formed of an integral assembly of at least two tabular light guide plate units each having a rear surface with a groove formed to accommodate a rod type light source and a light exit surface that is away from the rear surface and which is for emitting the light from the rod type light source; and a transmittance adjuster unit that is provided on a side closer to the light exit surface of the light guide plate, which diffuses the light emitted from the light exit surface of the light guide plate and emits the thus diffused light and which has a sheet type optical member capable of transmitting light and transmittance adjusters provided on at least one surface of the sheet type optical member, wherein the transmittance adjusters in the transmittance adjuster unit at a position corresponding to a seam between adjacent light guide plate blocks are distributed at a different density than the transmittance adjusters in the transmittance adjuster unit at a position corresponding to a joint between adjacent light guide plate units.

The planar lighting device according to the first aspect of the present invention is preferably such that a density of the transmittance adjusters in the transmittance adjuster unit at the position corresponding to the seam between adjacent light guide plate blocks is higher than a density of the transmittance adjusters in the transmittance adjuster unit at the position corresponding to the joint between adjacent light guide plate units.

In another preferred embodiment, the planar lighting device according to the first aspect of the present invention is such that if a pattern density of the transmittance adjusters in the transmittance adjuster unit at a specified position (x,y) in a region corresponding to the light guide plate blocks is denoted as $\rho(x,y)$, a maximum brightness $F_{max}$ of illuminating light that is obtained when the planar lighting device is not furnished with the transmittance adjuster unit is assumed to be unity, and a relative brightness with respect to the maximum brightness $F_{max}$ of illuminating light that is emitted from the specified position (x,y) is denoted as $F(x,y)$, then the relative brightness $F(x,y)$ and the pattern density $\rho(x,y)$ satisfy either of the following relations:

$$\rho(x,y)=c\{F(x,y)-F_{min}\}/(F_{max}-F_{min})$$

where c satisfies $0.5 \leq c \leq 1$ and $F_{min}$ is a minimum value of the relative brightness $F(x,y)$; alternatively, $$\rho(x,y)=c\{F(x,y)-F_{min}\}/(F_{max}-F_{min})+\rho_b$$

where c satisfies $0.5 \leq c \leq 1$, $\rho_b$ satisfies $0 \leq \rho_b \leq 1.5$, and $F_{min}$ is a minimum value of the relative brightness $F(x,y)$; or $$\rho(x,y)=c\{F(x,y)-F_{min}\}/(F_{max}-F_{min})+\rho_b$$

where c satisfies $0 < c \leq 0.3$, $\rho_b$ satisfies $0.5 \leq \rho_b$, and $F_{min}$ is a minimum value of the relative brightness $F(x,y)$.

In order to attain the first object described above, the second aspect of the present invention provides a planar lighting device, comprising: rod type light sources; a light guide plate comprising light guide plate blocks that are arranged side by side and each of which is formed of an integral assembly of at least two tabular light guide plate units each having a rear surface with a groove formed to accommodate a rod type light source and a light exit surface that is away from the rear surface and which is for emitting the light from the rod type light source; and a transmittance adjuster unit that is provided on a side closer to the light exit surface of the light guide plate and which comprises a first transmittance adjusting member having a first sheet type optical member capable of transmitting light and first transmittance adjusters provided on at least one surface of the first sheet type optical member and a second transmittance adjusting member having a second sheet type optical member capable of transmitting light and second transmittance adjusters provided on at least one surface of the first sheet type optical member in a position corresponding to a seam between adjacent light guide plate blocks, wherein the second transmittance adjusters are distributed at a different density than the first transmittance adjusters in a position corresponding to a joint between adjacent light guide plate units.

The planar lighting device according to the second aspect of the present invention is preferably such that a density of the second transmittance adjusters is higher than a density of the first transmittance adjusters at the position corresponding to the joint between adjacent light guide plate units.

The planar lighting device according to the second aspect of the present invention is preferably such that if a pattern density of the first transmittance adjusters in a specified position (x1,y1) is denoted as $\rho1(x1,y1)$, a maximum brightness $F1_{max}$ of illuminating light that is obtained when the planar lighting device is not furnished with the transmittance adjuster unit is assumed to be unity, and a relative brightness with respect to the maximum brightness $F1_{max}$ of illuminating light that is emitted from the specified position (x1,y1) is denoted as $F1(x1,y1)$, then the relative brightness $F1(x1,y1)$ and the pattern density $\rho 1(x1,y1)$ satisfy either of the following relations:

$$\rho 1(x1,y1)=c_1\{F1(x1,y1)-F1_{min}\}/(F1_{max}-F1_{min})$$

where $c_1$ satisfies $0.5 \leq c_1 \leq 1$ and $F1_{min}$ is a minimum value of the relative brightness $F1(x1,y1)$; alternatively, $$\rho 1(x1,y1)=c_1\{F(x1,y1)-F1_{min}\}/(F1_{max}-F1_{min})+\rho_b$$

where $c_1$ satisfies $0.5 \leq c_1 \leq 1$, $\rho_b$ satisfies $0 \leq \rho_b \leq 1.5$, and $F1_{min}$ is a minimum value of the relative brightness $F1(x1,y1)$; or $$\rho 1(x1,y1)=c_1\{F(x1,y1)-F1_{min}\}/(F1_{max}-F1_{min})+\rho_b$$

where $c$ satisfies $0 \leq c_1 \leq 0.3$, $\rho_b$ satisfies $0.5 \leq \rho_b$, and $F1_{min}$ is a minimum value of the relative brightness $F1(x1,y1)$.

In another preferred embodiment, if a pattern density of the second transmittance adjusters in a specified position $(x2,y2)$ is denoted as $\rho 2(x2,y2)$, a maximum brightness $F2_{max}$ of illuminating light that is emitted from the light exit surface of the transmittance adjuster unit when the planar lighting device is not furnished with the second transmittance adjusting member is assumed to be unity, and a relative brightness with respect to the maximum brightness $F2_{max}$ of illuminating light that is emitted from the specified position $(x2,y2)$ is denoted as $F2(x2,y2)$, then the relative brightness $F2(x2,y2)$ and the pattern density $\rho 2(x2,y2)$ satisfy the following relation:

$$\rho 2(x2,y2)=c_2\{F2(x2,y2)-F2_{min}\}/(F2_{max}-F2_{min})$$

where $c_2$ satisfies $0.5 \leq c_2 \leq 1$ and $F2_{min}$ is a minimum value of the relative brightness $F2(x2,y2)$.

In order to attain the second object described above, a third aspect of the present invention provides a liquid crystal display device, comprising: a planar lighting device according to the first or second aspect of the present invention; a liquid crystal display panel provided on a side closer to the light exit surface of the planar lighting device; and a drive unit for driving the liquid crystal display panel.

The planar lighting devices according to the first and second aspects of the present invention have the advantage that even if a light guide plate comprising a plurality of light guide plate units connected together is used with a view to increasing the area from which illuminating light emerges, no perceivable bright or dark lines will be generated in the joint between adjacent light guide plate blocks so that a wide enough range can be illuminated with light in the absence of any unevenness in brightness.

The liquid crystal display device according to the third aspect of the present invention employs the planar lighting device according to the first or second aspect described above, so it has the advantage that even if the display area is made larger than in the prior art, the degree of unevenness in brightness is sufficiently smaller to enable displaying an image of good quality.

DESCRIPTION OF THE PREFERRED EMBODIMENTS

Hereinafter, the planar lighting device according to the present invention and the liquid crystal display device using the same will be described in detail based on the preferred embodiments shown in the accompanying drawings.

Figure 1:
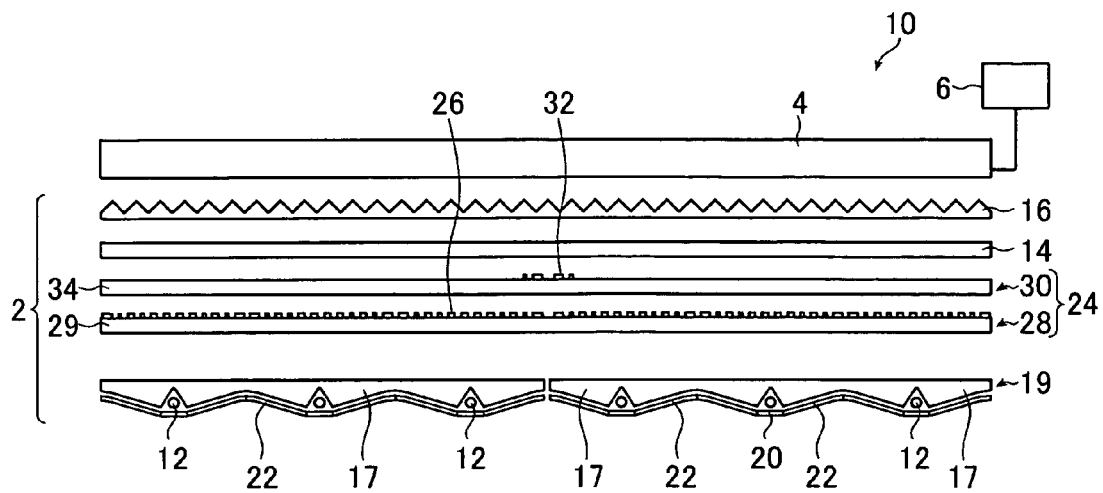
FIG. 1 is a schematic compositional section showing a plurality of monolithic light guide plates that are used in the planar lighting device of the present invention.
Figure 2A:
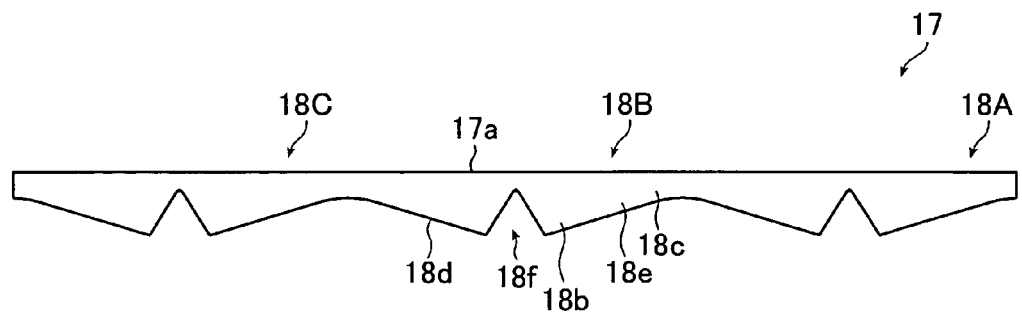
FIG. 2A is a schematic sectional view of a single light guide plate block of the backlight unit shown in FIG. 1.
Figure 2B:
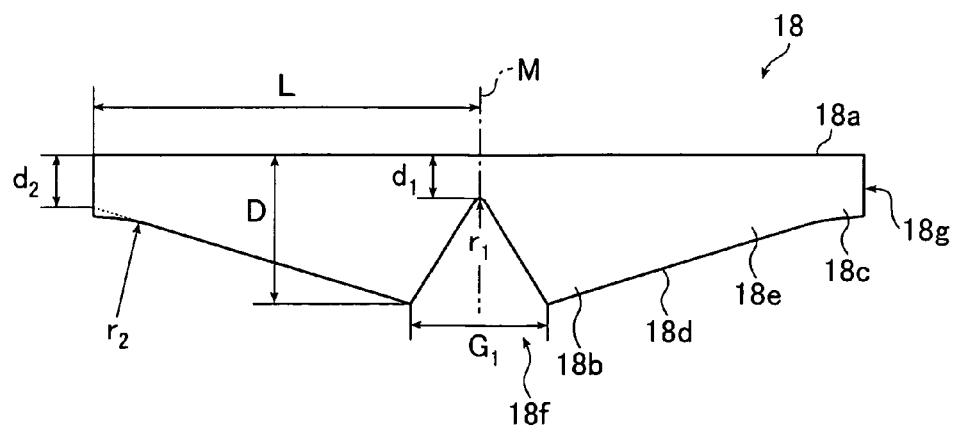
FIG. 2B is a schematic sectional view of a single light guide plate unit of the backlight unit shown in FIG. 1.

FIG. 1 is a schematic sectional view of a liquid crystal display device 10 according to the second aspect of the present invention that uses a planar lighting device 2 according to the first aspect of the present invention (which lighting device is hereinafter referred to as the backlight unit). FIG. 2A is a schematic sectional view of a single light guide plate block 17 of the backlight unit 2 shown in FIG. 1. FIG. 2B is a schematic sectional view of a single light guide plate unit 18 of the backlight unit 2 shown in FIG. 1. As shown in FIGS. 1, 2A and 2B, the liquid crystal display device 10 basically includes the backlight unit 2, a liquid crystal display panel 4 disposed on a side closer to a light exit surface side of the backlight unit 2, and a drive unit 6 for driving those components (its connection to the backlight unit 2 is not shown).

The liquid crystal display panel 4 comprises liquid crystal molecules that are preliminarily oriented in a particular direction and which are partly placed in an electric field to change their orientation, with the resulting refractive index change within the liquid crystal cells being utilized to display characters, graphics, images, etc. on a surface of the liquid crystal display panel 4.

The liquid crystal display panel 4 may be one that follows various liquid crystal display aspects including GH, PC, TN, STN, ECB, PDLC, IPS (in-plane switching), varieties of the VA (vertical aligned) system (e.g. MVA, PVA and EVA), OCB, ferroelectric liquid crystal, anti-ferroelectric liquid crystal, etc. The drive method for the liquid crystal display panel 4 is not limited in any particular way, either, and already known drive methods such as simple matrix driving and active matrix driving may be employed.

The drive unit 6 applies voltage to the transparent electrodes (not shown) within the liquid crystal display panel 4 so that the liquid crystal molecules are re-oriented to typically control the transmittance of light passing through the liquid crystal display panel 4.

The backlight unit 2 is a planar lighting device for evenly irradiating the entire surface of the liquid crystal display panel 4 with light from its rear side, and has a light exit surface (light emitting surface) having substantially the same size as an image display surface of the liquid crystal display panel 4. The backlight unit 2 is, as shown in FIG. 1, basically provided with a light source 12, a diffusion film 14, a prism sheet 16, a light guide plate 19, a reflector 20, a reflective sheet 22, and a transmittance adjuster unit 24. As shown in FIG. 1, the light guide plate 19 used in the backlight unit 2 according to the embodiment under consideration is composed of more than one light guide plate block 17 that is an integral assembly of three light guide plate units. In the present invention, a light guide member having a flat rectangular light exit surface for emitting light and a rear surface that is away from the light exit surface and which has one groove formed therein for accommodating a linear light source is called a light guide plate unit, and at least two light guide units are molded monolithically to form an integral assembly which is called a light guide plate block. A plurality of such light guide plate blocks are connected to form a light guide member in larger size, which is called a light guide plate. On the pages that follow, the components of the backlight unit 2 are individually described.

(Light Source)

The light source (rod of light source) 12 is a small-diameter rod of cold-cathode tube, which is used for illuminating the liquid crystal display panel 4. The light source 12 is provided inside a parallel groove 18f formed in the light guide plate unit 18 and connected to the drive unit 6 (the connection is not shown). In the case under consideration, the light source 12 is the cold-cathode tube, but the present invention is not limited to this and any rod of light source can be used. The light source 12 may be, for example, an external electrode tube, an ordinary fluorescent tube or an LED (light emitting diode).

For example, a transparent light guide in either a cylindrical or a prismatic form comparable in length to the parallel groove 18f in the light guide plate unit 18 to be described later may be provided with an LED on both of its top and bottom sides and the thus formed LED light source may be substituted for the light source 12. With such LED light source, light from the LED may be admitted into the top and bottom sides of the light guide and then allowed to emerge from its lateral sides.

(Light Guide Plate)

As already mentioned, the light guide plate 19 as part of the backlight unit is formed by coupling a plurality of light guide plate blocks 17 side by side, each light guide plate block 17 being an integral assembly of three light guide plate units 18. FIG. 2A is a schematic sectional view of the light guide plate block 17 which is an integral assembly of three light guide plate units 18A, 18B and 18C (the block may hereinafter sometimes be referred to as a 3-unit type), and FIG. 2B is a schematic sectional view of the light guide plate unit 18. As shown in FIGS. 2A and 2B, the light guide plate unit 18 includes a rectangular light exit surface 18a, a thick portion 18b extending parallel with one of the sides of the plate 18, thin edge portions 18c formed at both sides of the thick portion 18b and which also extend parallel with said one of the sides, inclined rear portions 18e having inclined surfaces 18d formed by reducing the thickness from the thick portion 18b toward the thin edge portions 18c in a direction perpendicular to said one of the sides, and the parallel groove 18f which accommodates the light source 12 and is formed in the thick portion 18b parallel with said one of the sides. The light guide plate unit 18 is a flat plate whose surface assumes a rectangular outer shape and is formed of a transparent resin.

As shown in FIG. 2B, each inclined surface 18d is partly curved in an end portion so that it connects smoothly with the corresponding inclined surface of an adjacent light guide plate unit 18. Here, an end portion of each inclined surface 18d is partly shaped to have a curved surface but it may be rendered flat. Alternatively, the entire part of the inclined surface 18d may be curved.

As also shown in FIG. 2B, the light guide plate unit 18 is symmetrical with respect to the center line M passing through the center of the parallel groove 18f and extending perpendicular to the light exit surface 18b of the light guide plate unit 18. The parallel groove 18f for accommodating the light source 12 extends in a longitudinal direction in the thick portion 18b of the light guide plate unit 18 on the side away from the light exit surface 18a. The depth of the parallel groove 18f is preferably determined such that no part of the light source 12 will protrude from the underside of the light guide plate unit 18. The depth is preferably determined in consideration of the size of the light source 12, as well as the mechanical strength and aging of the light guide plate unit 18. Also, the thicknesses of the thick portion 18b and thin edge portions 18c of the light guide plate unit 18 can be changed arbitrarily in accordance with the size of the light source 12. Here, the parallel groove 18f of the light guide plate unit 18 may be formed in a direction perpendicular to the longitudinal direction of the light guide plate unit 18, but it is preferably formed in the longitudinal direction in order to assure more efficient use of the light from the light source 12 accommodated in the parallel groove 18f.

As shown in FIG. 2A, the light guide plate block 17 consists of light guide plate units that have the structure shown in FIG. 2B and which are connected together to form an integral assembly. In other words, the light guide plate block 17 is a plate of transparent member which, as shown in FIG. 2A, has a flat rectangular light exit surface 17a and a rear surface which is away from it and has three linear, parallel grooves formed therein for accommodating rods of light source. The parallel grooves 18f in the rear surface are formed parallel to each other at equal spacings. That part of the rear surface which is defined by adjacent parallel grooves 18f is inclined with respect to the light exit surface in such a way that it gradually decreases in thickness with the increasing distance from each parallel groove 18f. Similarly, that part of the rear surface which extends from each of the two outward parallel grooves 18f toward an end face of the light guide plate block 17 is inclined with respect to the light exit surface such that it gradually decreases in thickness in that direction. A plurality of light guide plate blocks 17 having this structure are produced individually.

In the illustrated case, three parallel grooves are formed in the rear surface of the light guide plate block 17; however, this is not the sole case of the present invention and all that is required is that at least two parallel grooves be formed to accommodate rods of light source 12 in the rear surface of the light guide plate block 17.

In the light guide plate block 17 having the structure shown in FIG. 2A, part of the light emitted from the light source 12 provided in the parallel groove 18f of each light guide plate unit 18 enters the inner portion of the light guide plate unit 18 through the sidewalls (light incident surfaces) forming the parallel groove 18f, is reflected on the inclined surfaces 18d of each light guide plate unit 18 and then exits from the light exit surface 18a. At this time, part of the light leaks from the underside of each light guide plate unit 18, but the leaked light is reflected on the reflective sheet 22 to be described later (see FIG. 1) which is formed on a side closer to the inclined surface 18d of the light guide plate 18, whereupon it enters the inner portion of the light guide plate unit 18 again and then exits from the light exit surface 18a. Thus, the light is evenly emitted from the light exit surface 18a of the light guide plate unit 18.

The light guide plate block 17 composed of three light guide plate units 18 can be prepared as an integral assembly by, for example, extrusion or injection molding of a heated resin feed or casting polymerization of a monomer, an oligomer or the like in a mold. A material for the light guide plate block 17 may be a transparent resin such as an MS resin, an acrylic resin or COP (cycloolefin polymer), and more specific examples include PC (polycarbonate), PMMA (polymethyl methacrylate), PET (polyethylene terephthalate), PP (polypropylene), benzyl methacrylate, etc. The transparent resin may comprise in it fine particles to scatter light and this can further improve the efficiency of light emission from the light exit surface.

In the embodiment under consideration, the parallel groove 18f in each light guide plate unit 18 the light guide plate block 17 is formed such that a section taken perpendicular to the longitudinal direction of the parallel groove 18f (which is hereinafter referred to simply as a sectional shape of the parallel groove) has a triangular shape. The shape of the parallel groove 18f will be described later.

In the case shown in FIG. 2A, the three light guide plate units 18 are molded monolithically to construct the light guide plate block 17; alternatively, two light guide plate units may be molded monolithically to construct a single light guide plate block, or even four or more light guide plate units may be molded monolithically to construct a single light guide plate block.

(Prism Sheet)

The prism sheet 16 is a transparent sheet formed by arranging plural prisms in parallel and this can enhance the condensing property of light emitted from the light exit surface 18a of the light guide plate unit 18 of the light guide plate 19 to provide improved brightness. A prism array of the prism sheet 16 extends parallel to the parallel groove 18f in the light guide plate unit 18. Further, the prism sheet 16 is provided such that the vertex of each prism does not face the light exit surface 18a of the light guide plate unit 18.

Here, one prism sheet is employed but an additional prism sheet may be provided. In the case of using more than one prism sheet, the order of arranging the individual sheets is not particularly limited. For example, referring to FIG. 1, a first prism sheet having prisms that extend in a direction parallel to the parallel groove 18f in each of the light guide plate units 18 that compose the light guide plate 19 may be provided just above the light guide plate 19, and a second prism sheet having prisms that extend in a direction perpendicular to the parallel groove 18f in each of the light guide plate units 18 that compose the light guide plate 19 may be provided on top of the first prism sheet; the order of arrangement of the two prism sheets may be reversed.

In the case illustrated in FIG. 1, the prism sheet is used but it may be replaced by a sheet on which optical elements like the prism are regularly arranged. Further, a sheet on which elements having a lens effect, for example, a lenticulated lens, a concave lens, a convex lens, or an optical element in pyramidal shape are regularly arranged may be substituted for the prism sheet.

Figure 3A:
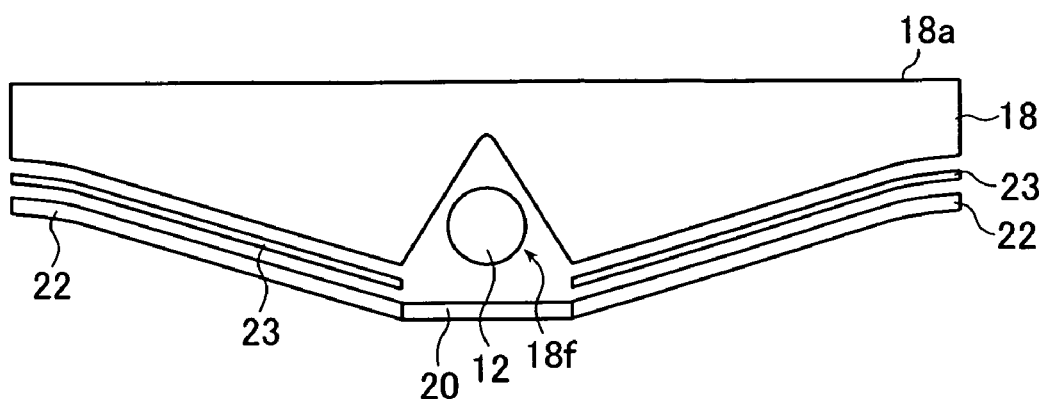
FIG. 3A is a schematic sectional view showing how a prism sheet is sandwiched between a reflective sheet and an inclined rear surface of the light guide plate.
Figure 3B:
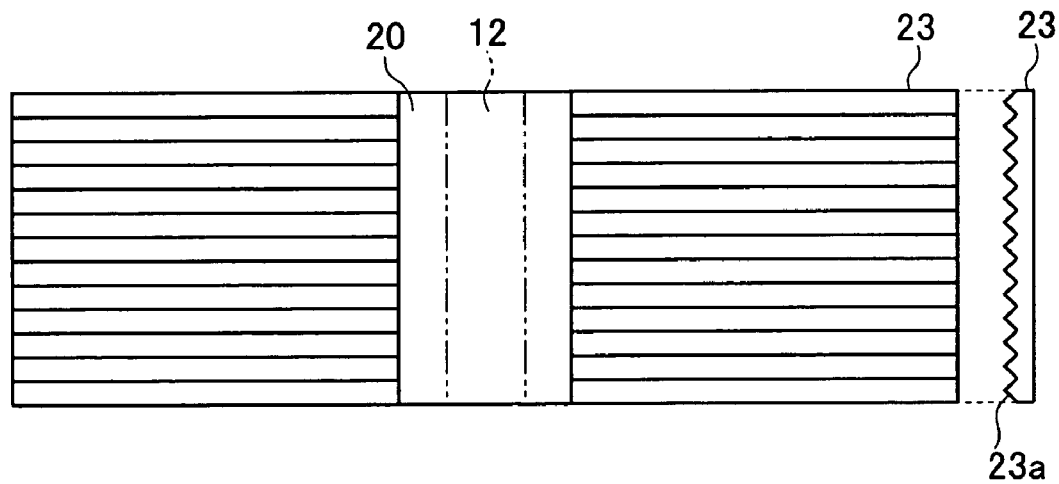
FIG. 3B shows in schematic plan view and schematic cross-sectional view the prism sheet sandwiched between the reflective sheet and the inclined rear surface of the light guide plate as it is seen from the light guide plate.

In the present invention, as shown in FIGS. 3A and 3B, it is preferable to interpose an additional prism sheet 23 between the reflective sheet 22 and the inclined surface 18d of the light guide plate unit 18 which is away from the light exit surface 18a. FIG. 3A is a schematic sectional view showing how the prism sheet 23 is provided between the reflective sheet 22 and the inclined surface 18d of the light guide plate unit 18; FIG. 3B shows in schematic plan view and schematic cross-sectional view of the prism sheet 23 interposed between the reflective sheet 22 and the inclined surface 18d of the light guide plate unit 18 as it is seen from the light guide plate. The prism sheet 23 interposed between the reflective sheet 22 and the inclined surface 18d of the light guide plate unit 18 is preferably provided such that prisms 23a extend in a direction perpendicular to the parallel groove 18f in the light guide plate unit 18 and that the vertex of each prism 23a faces the inclined surface 18d of the light guide plate unit 18.

In FIGS. 3(A) and 3(B), the prism sheet 23 is provided between the reflective sheet 22 and the inclined surface 18d of the light guide plate unit 18, but it is possible to provide an optical element having a similar effect to the prism sheet; for example, a sheet on which optical elements having the lens effect such as a lenticulated lens, a concave lens, a convex lens, or an optical element in pyramidal shape are regularly arranged may be provided.

Note that in FIGS. 3(A) and 3(B) showing a preferred embodiment, the prism sheet 23 is used as a component of the backlight unit but if the brightness on the light exit surface 18a determined by the parallel groove 18f in the light guide plate unit 18 is already made sufficiently uniform, this prism sheet 23 is of course unnecessary, and even the prism sheet 16 may be dispensed with. Using a smaller number of expensive prism sheets or dispensing with prism sheets contributes to reducing the equipment costs.

(Reflective Sheet and Reflector)

The reflective sheet 22 is for reflecting light leaking from the rear surface (the underside in FIG. 2A) of each of the light guide plate blocks 18 in the light guide plate 19 so that the reflected light will enter each of the light guide plate blocks 17 again, so that the light can be used more efficiently. The reflective sheet 22 covers the underside (inclined surface) of each light guide plate block 17, i.e., the inclined surface 18d of the light guide plate unit 18. The reflector 20 is provided behind the light source 12 in such a way as to block the parallel groove 18f in each of the light guide plate units 18 composing each light guide plate block 17. The reflector 20 reflects the light from the underside of the light source 12 so that the reflected light enters each of the light guide plate units 18 through sidewall surfaces of the parallel groove 18f. Note that while, in the embodiment under discussion, the reflective sheet 22 and the reflector 20 are separately provided, the reflective sheet 22 and the reflector 20 may be formed into a single plate of member to replace the reflective sheet 22 and the reflector 20 provided separately.

The reflective sheet 22 may be formed of any material that is capable of reflecting the light leaking from the rear surface (the underside in FIG. 2A) of each light guide plate block 17. Exemplary materials that can be used to form the sheet include: a resin sheet whose reflectivity is enhanced by kneading PET, PP (polypropylene), etc., with a filler and then drawing the resultant mixture to thereby form voids; a sheet obtained by mirror-finishing the surface of a transparent resin sheet or a white resin sheet of the type described above, through vapor deposition of aluminum or the like; a metal foil such as an aluminum foil or a resin sheet carrying the metal foil; and a metal thin plate having sufficient surface reflectivity.

(Diffusion Film)

The diffusion film 14 is a single film with which the light emerging from the light exit surface of the light guide plate 19 is diffused to become uniform and it is formed by imparting light diffusion property to a film of member that is made of an MS resin, an acrylic resin or COP (cycloolefin polymer), more specifically an optically transparent resin such as PET (polyethylene terephthalate), PP (polypropylene), PC (polycarbonate), PMMA (polymethyl methacrylate), benzyl methacrylate, etc. The method of forming the film of member is not particularly limited, but the sheet may be formed by, for example, imparting the light dispersion property through finely embossing, polishing or otherwise processing the surface of the tabular member to produce a roughened surface (hereinafter, the treated surface is referred to as "sanded surface" or "sand-rubbed surface"), or by coating the surface with a material that scatters light, as exemplified by a pigment such as silica, titanium oxide or zinc oxide, a resin, or beads of glass or zirconium, together with a binder, or by kneading the aforementioned resin with the above-mentioned pigment or beads that scatter light. In the present invention, the diffusion film 14 may be of a matted or coated type.

In the present invention, the diffusion film 14 is preferably a film of member in a thickness of 500 μm or less that is made of any of the above-mentioned materials and which has been provided with the light diffusion property.

(Transmittance Adjuster Unit)

In the next place, the transmittance adjuster unit 24 is described. The transmittance adjuster unit 24 is composed of a first transmittance adjusting member 28 and a second transmittance adjusting member 30. In the illustrated case, the second transmittance adjusting member 30 is provided closer to the light entrance side than the first transmittance adjusting member 28. However, the present invention does not require any fixed order to be observed in arranging the first transmittance adjusting member 28 and the second transmittance adjusting member 30. In addition, the first transmittance adjusting member 28 and the second transmittance adjusting member 30 may be provided in intimate contact with each other or they may be spaced apart by a specified distance.

The first transmittance adjusting member 28 primarily functions to reduce the unevenness in brightness of planar illuminating light that is emitted from the light exit surface of the light guide plate block 17. When a plurality of light guide plate blocks 17 are combined to make a larger light guide plate 19, the second transmittance adjusting member 30 functions to prevent or reduce the generation of bright or dark lines in a region corresponding to the boundary between adjacent light guide plate blocks 17. By using the transmittance adjuster unit 24 which has the first transmittance adjusting member 28 thus combined with the second transmittance adjusting member 30, the unevenness in brightness of planar illuminating light that is emitted from the light exit surface of the light guide plate block and the unevenness in brightness that occurs in a region corresponding to the boundary between adjacent light guide plate blocks can be both reduced so that uniform illuminating light with reduced unevenness in brightness can be obtained from the light guide plate 19.

Each of the first transmittance adjusting member 28 and the second transmittance adjusting member 30 comprises a transparent film having a large number of transmittance adjusters arranged thereon. The first transmittance adjusting member 28 comprises a transparent film 29 having transmittance adjusters (the first transmittance adjusters) 26 arranged on it, and the second transmittance adjusting member 30 comprises a transparent film 34 having transmittance adjusters (the second transmittance adjusters) 32 arranged on it; the first transmittance adjusters 26 may be composed of the same material as the second transmittance adjusters 32.

On the following pages, the first transmittance adjusting member 28 and the second transmittance adjusting member 30 are described in detail. To begin with, the first transmittance adjusting member 28 shall be described.

As already mentioned, the first transmittance adjusting member 28 in the embodiment under consideration is used to reduce the unevenness in brightness of the light that is emitted from the light exit surface 17a of the light guide plate block 17, and it comprises the transparent film 29 and the large number of the first transmittance adjusters 26 that are arranged on a surface of the transparent film 29.

The transparent film 29 is shaped like a film and is formed of an optically transparent material such as PET (polyethylene terephthalate), PP (polypropylene), PC (polycarbonate), PMMA (polymethyl methacrylate), benzyl methacrylate or MS resin, other acrylic resins, or COP (cycloolefin copolymer).

The first transmittance adjusters 26 are dots of various sizes having a specified transmittance and they have square, circular, hexagonal or other geometries that are printed or otherwise formed on the entire surface of the transparent film 29 that faces the light guide plate unit 18, in a specified pattern, say, a half-tone dot pattern in which the dot size and count are position-dependent.

The first transmittance adjusters 26 may be a diffusive reflector that may be prepared by, for example, coating the surface with a material that scatters light, as exemplified by a pigment such as silica, titanium oxide or zinc oxide, a resin, or beads of glass or zirconium, together with a binder, or by finely embossing or polishing the surface to produce a surface roughened pattern. Other useful materials are ones that have high reflectance and low absorption of light and which may be exemplified by metals such as Ag and Al.

Common white ink which is employed in screen printing, offset printing and the like may be used to form the first transmittance adjusters 26. Examples are an ink that has titanium oxide, zinc oxide, zinc sulfate, barium sulfate, etc. dispersed in an acrylic binder, a polyester-based binder, a vinyl chloride containing binder, etc. and an ink that has titanium oxide mixed with silica to impart a diffusing property.

Figure 4A:
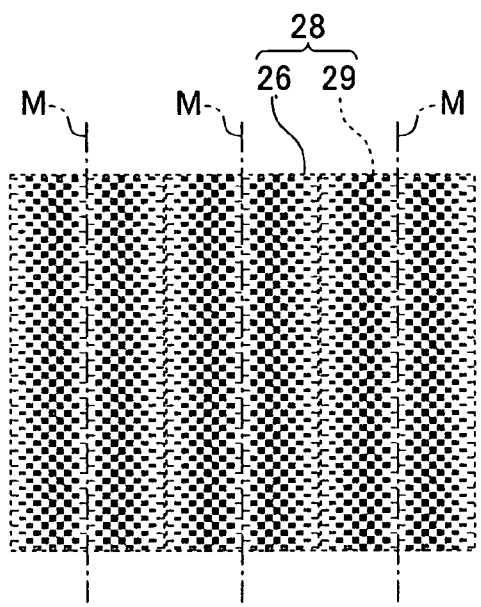
FIG. 4A is a diagram showing an exemplary pattern of the first transmittance adjusters in the first transmittance adjusting member.
Figure 4B:
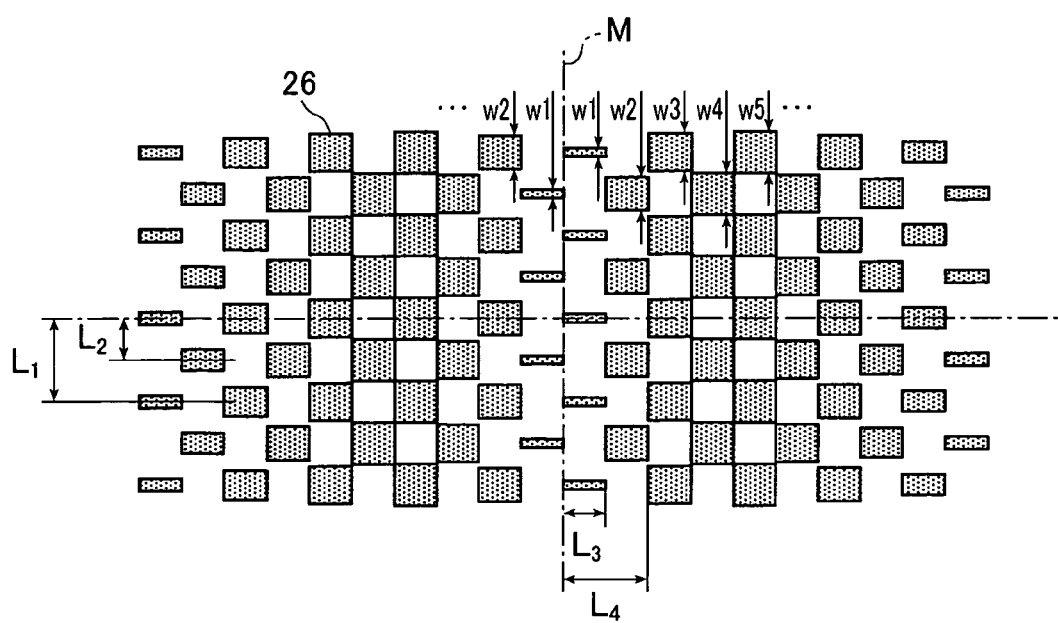
FIG. 4B shows in more detail part of the arrangement pattern of the first transmittance adjusters of the first transmittance adjusting member shown in FIG. 4A.

FIG. 4 shows an exemplary case of arranging the first transmittance adjusters 26 in a half-tone dot pattern. FIG. 4A is a schematic diagram showing an exemplary pattern for the arrangement of the first transmittance adjusters 26 that are formed on the transparent film 29, more specifically the first transmittance adjusters 26 that are arranged in a region that corresponds to the light exit surface of a single light guide plate block 17. FIG. 4B is an enlarged schematic view showing enlarged that part of the pattern for the arrangement of the first transmittance adjusters 26 shown in FIG. 4A which corresponds to a single light guide plate unit 18. In both FIGS. 4A and 4B, the center of the light guide plate unit 18, or the center of the parallel groove 18$f$, is indicated by a dot and dash line M.

As will be described later in detail, the pattern for the arrangement of the first transmittance adjusters 26 in the first transmittance adjusting member 28 is designed on the basis of the brightness distribution that is obtained with illuminating light when a backlight unit is constructed using a light guide plate block 17 without furnishing it with the first transmittance adjusting member 28. Therefore, if a plurality of light guide plate blocks 17 are combined to make a larger light guide plate which in turn is used to construct a backlight unit, the pattern for the arrangement of the first transmittance adjusters 26 shown in FIG. 4A is repeatedly formed in such a way that it corresponds to the respective light guide plate blocks, thereby fabricating a single first transmittance adjusting member.

Described below is an exemplary method of designing the pattern for the arrangement of the first transmittance adjusters 26 in the first transmittance adjusting member 28. Suppose here that the pattern density of the first transmittance adjusting member 28 in a given position (x1,y1) is written as $\rho 1(x1, y1)$. Also suppose that a backlight unit is constructed using a light guide plate block 17 without furnishing it with the first transmittance adjusting member 28. In this case, the relative brightness of light that is emitted from the given position (x1,y1) on the light exit surface of the backlight unit 2 (the side facing the liquid crystal display panel 4) may be written as F1(x1,y1). In the present invention, the pattern density $\rho 1(x1,y1)$ of the first transmittance adjusting member 28 is designed such that it satisfies either of the following Equations 1 and 2 with respect to the relative brightness F1(x1,y1):

$$\rho 1(x1,y1) = c_1 \{F1(x1,y1) - F_{min}\}/(F_{max} - F_{min}) \qquad \text{Eq. 1}$$

or $$\rho 1(x1,y1) = c_1 \{F1(x1,y1) - F_{min}\}/(F_{max} - F_{min}) + \rho_b \qquad \text{Eq. 2}$$

In Equations 1 and 2, $F_{max}$ represents a maximum brightness and $F_{min}$ a minimum brightness of the light that is emitted from the light exit surface of the diffusion film 14 in the backlight unit 2 when it is not furnished with the first transmittance adjusting member 28. Note here that the relative brightness F1(x1,y1) is referenced against the maximum brightness $F_{max}$ ($F_{max}=1$).

In Equations 1 and 2, $c_1$ is a maximum density and it preferably satisfies $0.5 \leq c_1 \leq 1$.

Here, the pattern density $\rho 1(x1,y1)$ represents a filling factor of the transmittance adjusters 26, i.e., the ratio of the area occupied by the transmittance adjusters 26 located in the given position (x1,y1) to a unit area (1 mm$^2$); when $\rho_1(x1,y1)=1$, the transmittance adjusters 26 are arranged over the whole unit area, and when $\rho_1(x1,y1)=0$, there are no transmittance adjusters at all that are arranged within the unit area.

When a design for the arrangement of the transmittance adjusters is provided with the pattern density based on Equation 1 above, unevenness in brightness may occur when observed at an angle other than from the front. To reduce such unevenness in brightness, it is preferable to add a "uniform density distribution (bias density $\rho_b$)" to the density distribution worked out as indicated by Equation 2. This will reduce unevenness in brightness, and eliminate or reduce the angle-dependent unevenness in brightness.

The bias density $\rho_b$ is preferably in the range of 0 to 1.50 (0-150%), i.e., $0 < \rho_b \leq 1.5$, and more preferably $0.01 \leq \rho_b \leq 1.5$. In cases where the distribution density exceeds 1 (100%), the transmittance adjusters are provided in two layers. More specifically, transmittance adjusters having a distribution density of ($\rho_b - 1$) is disposed on the transmittance adjusters that already fill up the surface of the transparent film. The transmittance adjusters have a uniform thickness and, accordingly, the whole thickness of the transmittance adjusters disposed in two layers is doubled.

By arranging the first transmittance adjusters 26 of the first transmittance adjusting member 28 in such a way as to satisfy the pattern density $\rho_1(x1,y1)$ defined by Equation 1, the illuminating light emitted from the light exit surface in a region corresponding to the light guide plate block 17 in the backlight unit 2 can not only be protected against a drop in average brightness but also rendered to have a smaller degree of unevenness in brightness. Since the unevenness in brightness that occurs in a region corresponding to the light guide plate block is thus reduced by using the first transmittance adjusting member 28, the degree to which the diffusion film 14 needs to diffuse light decreases accordingly. As a result, the diffusion film 14 can be made thinner and the prism sheet can be dispensed with or a smaller number of prism sheets suffice, making it possible to provide an even lighter and less costly backlight unit.

Here, as already mentioned, the maximum density $c_1$ is preferably adjusted to satisfy the relation $0.5 \leq c_1 \leq 1$. By adjusting the maximum density $c_1$ to be at least 0.5, the drop in average brightness can also be suppressed to ensure the emission of bright and uniform light.

In addition, when the pattern density $\rho_1(x1,y1)$ is equal to unity, or the first transmittance adjusters 26 are arranged throughout the unit area, they preferably provide a transmittance of 10% (inclusive) to 50% (inclusive), more preferably between 20% (inclusive) and 40% (inclusive).

If the transmittance is 10% or more, the unevenness in brightness can be effectively reduced; by providing a transmittance of 50% or less, the unevenness in brightness can be reduced without lowering the average brightness.

These advantages can be obtained more effectively if the transmittance is adjusted to lie between 20% (inclusive) and 40% (inclusive).

In the embodiment under consideration, the first transmittance adjusters 26 are of a square shape but this is not the sole case of the present invention and they may assume any other shapes, including triangular, hexagonal, circular and elliptical.

In addition, if a linear light source and a plurality of light guide plate units, each of which units has a same cross section taken along a direction perpendicular to the axis of the linear light source throughout the axis, are used to construct a backlight unit as in the embodiment under consideration, the first transmittance adjusters may individually be shaped like a ribbon (elongated strip) that is parallel to the axis of the linear light source.

Described next is the second transmittance adjusting member 30.

As shown in FIG. 1, the second transmittance adjusting member 30 is provided to face the light entrance side of the first transmittance adjusting member 28. The second transmittance adjusting member 30 provided to face the light exit side of the first transmittance adjusting member 28 serves to prevent the occurrence of bright or dark lines in a region corresponding to the seam between adjacent light guide plate blocks 17. The second transmittance adjusting member 30 comprises the transparent film 34 and the second transmittance adjusters 32 that are formed in a specified pattern on the film 34. The second transmittance adjusters 32 are made of the same material as the first transmittance adjusters 26. The transparent film 34 may be made of the same material as the transparent film 29 in the first transmittance adjusting member 28; alternatively, the two transparent films may be made of different materials. The second transmittance adjusters 32 are arranged on the transparent film 34 to have a specified density distribution in the region corresponding to the seam between adjacent light guide plate blocks 17.

As already mentioned, the arrangement pattern for the first transmittance adjusting member 28 is designed on the basis of the brightness distribution of illuminating light that is obtained from a backlight unit constructed using a single light guide plate block without furnishing it with the first transmittance adjusting member 28. Thus, if, as shown in FIG. 1, a plurality of light guide plate blocks 17 are connected to make a larger light guide plate 19 and when a single first transmittance adjusting member 28 is provided to face the light exit surface of the large light guide plate 19 to construct a backlight unit, the viewer of the brightness distribution of the illuminating light from that backlight unit can potentially perceive bright or dark lines in the region corresponding to the seam (joint) between adjacent light guide plate blocks 17. Hence, in the backlight unit according to the embodiment under consideration, the second transmittance adjusting member 30 is provided in order to correct the unevenness in brightness that occurs at the seam between adjacent light guide plate blocks 17. The pattern for the arrangement of the second transmittance adjusters 32 in the second transmittance adjusting member 30 is designed on the basis of the brightness distribution of the illuminating light coming from the seam between adjacent light guide plate blocks in the backlight unit that is formed such that a plurality of light guide plate blocks are combined to make a larger light guide plate and that the first transmittance adjusting member is provided to face its light exit surface. Thus, based on the brightness distribution, the pattern for the arrangement of the second transmittance adjusters can be designed by the same method as described above for designing the pattern for the arrangement of the first transmittance adjusters 28. The method is specifically described below.

First suppose that the pattern density of the second transmittance adjusting member 30 in a given position (x2,y2) is written as ρ2(x2,y2). Also suppose that a backlight unit is constructed using a light guide plate 19 composed of plural light guide plate blocks 17 that are furnished with the first transmittance adjusting member 28 but not the second transmittance adjusting member 30. In this case, the relative brightness of light that is emitted from the given position (x2,y2) on the light exit surface of the backlight unit (the side facing the liquid crystal display panel 4) may be written as F2(x2,y2). In the present invention, the pattern density ρ2(x2,y2) of the second transmittance adjusters 32 is designed such that it satisfies the following Equation 3 with respect to the relative brightness F2(x2,y2):

$$\rho2(x2,y2)=c_2\{F2(x2,y2)-F2_{min}\}/(F2_{max}-F2_{min}) \qquad \text{Eq. 3}$$

In Equation 3, $F2_{max}$ represents a maximum brightness and F2 min a minimum brightness of the light that is emitted from the light exit surface of the diffusion film 14 in the backlight unit 2 when it is not furnished with the second transmittance adjusting member 30. Note here that the relative brightness F2(x2,y2) is referenced against the maximum brightness $F2_{max}$ ($F2_{max}=1$).

In Equation 3, $c_2$ is a maximum density and it preferably satisfies $0.5 \leq c_2 \leq 1$.

Here, the pattern density $\rho_2(x2,y2)$ represents a filling factor of the second transmittance adjusters 32, i.e., the ratio of the area occupied by the transmittance adjusters 32 located in the given position (x2,y2) to a unit area (1 mm$^2$); when $\rho_2(x2,y2)=1$, the transmittance adjusters 32 are arranged over the whole unit area, and when $\rho_2(x2,y2)=0$, there are no transmittance adjusters at all that are arranged within the unit area.

In the embodiment under consideration, the two transmittance adjusting members, the first being 28 and the second 30, are used to construct the transmittance adjuster unit 24; alternatively, the transmittance adjuster unit 24 may be constructed using a single transmittance adjusting member. This contributes to reducing the number of parts and, hence, the cost. In this alternative case, the single first transmittance adjusting member which covers the entire surface of the light exit side of the light guide plate 19 may be so designed that the density distribution of the first transmittance adjusters arranged in a position that corresponds to the area where two light guide plate units are connected in a physically integral manner differs from the density distribution of the first transmittance adjusters arranged in a position that correspond to the area (seam) where two light guide plate blocks are connected in a physically independent manner. If, in the case of constructing the transmittance adjuster unit using only one transmittance adjusting member, bright lines are perceived at the seam between two light guide blocks, the density of the transmittance adjusters to be arranged in a region that correspond to the seam may be adjusted to be higher than that of the transmittance adjusters to be arranged in a region that correspond to the area where two light guide plate units are connected integrally. On the other hand, if dark lines are perceived in a region that corresponds to the seam between two light guide blocks, the density of the transmittance adjusters to be arranged in that region which corresponds to the seam may be adjusted to be lower than that of the transmittance adjusters to be arranged in a region that correspond to the area where two light guide plate units are connected in a physically integral manner. Thus, by ensuring that the transmittance adjusters arranged in the region that corresponds to the seam between two light guide plate blocks have a different density distribution than transmittance adjusters arranged in the region that corresponds to the area where two light guide plate units are connected in a physically integral manner, one can prevent or suppress the unevenness in brightness that may occur in the region that corresponds to the seam between two light guide plate blocks. As a result, one can obtain illuminating light that is uniform, free from unevenness in brightness and capable of covering a large enough area.

Another embodiment that can be realized in the present invention is such that the second transmittance adjusters 32 are formed on at least one surface of the diffusion film 14 shown in FIG. 1 whereas the first transmittance adjusters 26 are formed on the prism sheet 16. In this case, the diffusion film 14 and the second transmittance adjusters 32 formed on its surface combine to make the second transmittance adjusting member whereas the first transmittance adjusters 26 formed on the surface of the prism sheet 16 make the first transmittance adjusting member.

In another possible embodiment, the second transmittance adjusters may be formed on the light exit surface of the light guide plate 19 shown in FIG. 1, with the first transmittance adjusters being arranged on the surface where the second transmittance adjusters have been formed. In this case, the first transmittance adjusting member indicated by 28 in FIG. 1 can be dispensed with, realizing a further reduction in the number of parts and, hence, the cost. If the first transmittance adjusting member 28 is to be provided on a side closer to the light exit surface of the light guide plate 19, alignment must be established between the light guide plate 19 and the first transmittance adjusting member 28 during manufacture; on the other hand, if the second transmittance adjusters are formed on the light exit surface of the light guide plate and the first transmittance adjusters are arranged on the surface where the second transmittance adjusters have been formed, there is no need to establish alignment during manufacture, facilitating the assembling process.

While the arrangement such that the first transmittance adjusters and the second transmittance adjusters are directly disposed on the light guide plate provides a benefit that displacement is prevented, the second transmittance adjusters 32 are preferably disposed on the transparent film 30 or the prism sheet when the first transmittance adjusters 26 are provided directly on the light exit surface of the light guide plate 19. Forming the second transmittance adjusters 32 on a sheet of a member helps favorably reduce the unevenness in brightness that occurs in a region corresponding to the joint between the adjacent light guide plate blocks.

In the embodiment under consideration, the transmittance adjuster unit 24 is provided between the light guide plate 19 and the diffusion film 14; this is not the sole position that can be taken by the transmittance adjuster unit and it may be provided between the diffusion film 14 and the prism sheet 16.

In the embodiment under consideration which is shown in FIG. 1, the transmittance adjuster unit 24, the diffusion film 14 and the prism sheet 16 are superposed in that order on the side that faces the light exit surface of the light guide plate 19. However, this is not the sole order in which the individual members are to be arranged on the side that faces the light exit surface of the light guide plate 19 and in one alternative case, the transmittance adjuster unit, the prism sheet and the diffusion film may be superposed in that order on the side that faces the light exit surface of the light guide plate 19.

In the embodiment under consideration, the first transmittance adjusters 26 in the first transmittance adjusting member 28 are so arranged as to satisfy Equation 1 for the pattern density $\rho(x,y)$. However, the present invention is by no means limited to this particular preferred case and the first transmittance adjusters may be arranged with various pattern densities that can suppress the occurrence of unevenness in brightness. For example, one may employ a known transmittance adjuster unit in which the first transmittance adjusting member comprises the first transmittance adjusters that are arranged in such a way that they have a density distribution in a direction normal to the axis of the linear light source.

When the first transmittance adjusters 26 are disposed on the light exit surface of the light guide plate 19, i.e., on the light exit surface of the light guide plate blocks 17, it is also preferable that the maximum density $c_1$ be in the range of $0 < c_1 \leq 0.3$ and the bias density $\rho_b$ satisfy $0.5 \leq \rho_b$.

With the first transmittance adjusters 26 disposed directly on the light exit surface of the light guide plate 19, when, for example, the planar lighting device is so installed that the light exit surface lies in a plane parallel to the vertical direction, displacement of the light exit surface with respect to the arrangement pattern of the transmittance adjusters can be prevented in case of an installation whereby the light exit surface faces vertically downwardly.

With the first transmittance adjusters 26 of the first transmittance adjusting member 28 provided by satisfying the pattern density $\rho(x,y)$ as defined by Equation 2 above such that the maximum density $c_1$ lies in the range of $0 \leq c_1 \leq 0.3$ and the bias density $\rho_b$ lies in the range of $0.5 \leq \rho_b$, the lowering of the average brightness of the light exiting the light exit surface of the planar lighting device 10 can be curbed while the unevenness in brightness thereof can be reduced.

Further, angle-dependent unevenness in brightness that may occur depending on the pattern density of the first transmittance adjusters 26 can be eliminated by setting $\rho_b$ to 0.5 or greater in Equation 2 above to provide the first transmittance adjusters 26 over the whole light exit surface of the light guide plate 19 in a density greater than a specified value.

The angle-dependent unevenness in brightness refers to the unevenness in brightness that may occur depending on the angle at which a viewer looks at the light exit surface. For example, the brightness distribution as seen from a direction perpendicular to the light exit surface is different from that as seen at an angle of 45° with respect to the light exit surface, causing the brightness to change for the viewer depending on the angle at which the viewer looks at the light exit surface.

Thus, with $\rho_b$ set to 0.5 or greater, the brightness distribution (unevenness in brightness) of the light exiting the light exit surface of the light guide plate can be prevented from changing depending on the angle at which a viewer looks at the light exit surface of the light guide plate.

Further, it is possible to reduce the unevenness in brightness while maintaining the brightness at a high level by determining the pattern density based on the relative brightness $F1(x1,y1)$ using Equation 2.

Still further, the unevenness in brightness can be sufficiently reduced by setting the maximum density c to 0.3 or less even when the first transmittance adjusters are disposed directly on the light exit surface.

Thus, the unevenness in brightness can be reduced for a view taken at an angle with respect to the light exit surface as well as at a right angle by providing the first transmittance adjusters 26 of the first transmittance adjusting member 28 in a pattern density $\rho 1$ (x1,y1) that satisfies Equation 2 wherein the maximum density $c_1$ is set to a range of $0<c_1 \leq 0.3$ and the bias density $\rho_b$ is set to $0.5 \leq \rho_b$.

As described above, since the unevenness in brightness is reduced by using the first transmittance adjusting member 28, the degree to which the diffusion film 14 must diffuse light decreases accordingly. As a result, the diffusion film 14 can be made thinner and the prism sheet can be dispensed with or a smaller number of prism sheets suffice, making it possible to provide an even lighter and less costly backlight unit.

While the first transmittance adjusters 26 in the first transmittance adjusting member 28 are adjusted in their pattern density distribution in accordance with the light incident on the first transmittance adjusting member 28, the pattern density distribution of the first transmittance adjusters 26 may be adjusted by changing either their size or the distance by which the first transmittance adjusters 26 of a given shape are spaced apart.

Various methods can be employed to arrange the first transmittance adjusters 26 in accordance with the pattern density and they include FM screening and AM screening, with the former being preferred. By FM screening, the first transmittance adjusters 26 can be arranged as tiny and uniform dots which are dispersed or agglomerated as appropriate for ensuring that the pattern in which the first transmittance adjusters 26 are arranged is not easy to perceive from the light exit surface of the backlight unit. In other words, there is no chance that the pattern in which the first transmittance adjusters 26 are arranged is projected on the light exit surface of the backlight unit to cause uneven light to be emitted therefrom; as a result, more uniform light will be produced. A further advantage is that one can prevent the generation of dots that are so small as to introduce difficulty in forming the first transmittance adjusters 26.

The second transmittance adjusters 32 in the second transmittance adjusting member 26 can also be arranged by adopting various methods including FM screening and AM screening and the same advantages as described above in connection with the first transmittance adjusters 26 can be obtained by using FM screening.

Preferably, a maximum size of the first transmittance adjusters 26 and the second transmittance adjusters 32 is 500 µm or less (if they are rectangular in shape, the length of one side is 500 µm or less, and if they are elliptical in shape, their major axis is 500 µm or less), and more preferably 200 µm. By ensuring that the first transmittance adjusters 26 and the second transmittance adjusters 32 will not have a maximum size greater than 500 µm, the shapes of the first transmittance adjusters 26 and the second transmittance adjusters 32 become less visible, and by ensuring that they will not have a maximum size greater than 200 µm, the shapes of the first transmittance adjusters 26 and the second transmittance adjusters 32 become invisible; as a result, when the backlight unit is actually used with a liquid crystal display device, there is no chance that the shapes of the first transmittance adjusters 26 and the second transmittance adjusters 32 are projected on the light exit surface of the backlight unit to produce uneven brightness, and any unevenness in brightness can be efficiently reduced.

It is even more preferred to ensure that the first transmittance adjusters 26 and the second transmittance adjusters 32 will not have a maximum size greater than 100 µm. By adjusting their maximum size to 100 µm or less, one can more positively ensure that the size of the first and the second transmittance adjusters is smaller than is discernible by the naked eye; as a result, when the backlight unit is actually used with a liquid crystal display device, there is no chance that the shapes of the first transmittance adjusters 26 and the second transmittance adjusters 32 are projected on the light exit surface of the backlight unit to produce uneven brightness, and any unevenness in brightness can be reduced more positively and with high efficiency.

The first and the second transmittance adjusters can be printed on the surface of the transparent film by various methods including screen printing, offset printing, gravure printing, and ink-jet printing. Offset printing has the advantage of high productivity whereas screen printing has the advantage of providing a thick enough ink layer, so that the transmittance in patterned areas can be sufficiently lowered without increasing the ink density. Ink-jet printing enables printing on 3D objects and is an optimum method of forming the first or the second transmittance adjusters on the surface of the light guide plate.

If those printing methods are used to form the first and the second transmittance adjusters on the transparent film, the diffusion film, the prism sheet, the light guide plate or the like, two printing cycles will suffice, one for the first transmittance adjusters and the other for the second transmittance adjusters; if desired, more printing cycles may be performed.

In the case of printing the first and the second transmittance adjusters on the surface of the transparent film, alignment marks may be formed in regions other than where such first and second transmittance adjusters are to be formed. This allows for easier positioning to be effected when the first and the second transmittance adjusting member are arranged on the surface of the light guide plate.

While the preferred embodiments of the backlight unit of the present invention have been described above in detail, the backlight unit of the present invention that is furnished with the transmittance adjuster unit of the present invention will now be described in greater detail by reference to specific examples.

EXAMPLES

In this example, there was fabricated a backlight unit having the same structure as the backlight unit shown in FIG. 1. To be more specific, the backlight unit 2 of this example was composed of the light source 12, the diffusion film 14, the prism sheet 16, the light guide plate 19, the reflector 20, the reflective film 22, the first transmittance adjusting member 28, and the second transmittance adjusting member 30.

In this example, a cold cathode tube with a diameter R of 2.6 mm was used as the light source 12. The light guide plate unit 18 was of a shape having the following dimensions (see FIG. 2B): the distance L from the center of the light guide plate unit 18 to the face at which it was thinnest, or the face at which it joined to an adjacent light guide plate unit 18 was 14 mm; the thickness D of the thickest part of the thick-walled portion 18b of the light guide plate unit 18 was 5.5 mm; the distance $d_1$ between the bottom portion of the parallel groove 18f and the light exit surface was 1.0 mm; the thickness $d_2$ of the light guide plate unit at the face which would be thinnest if the inclined rear surface were assumed to have a flat end was 1.5 mm; the width $G_1$ of the mouth of the parallel groove 18f which was away from the light exit surface 18a was 5.3 mm; the radius of curvature $r_1$ of the deepest part of the bottom portion of the parallel groove 18f which was assumed to have a curved shape was 0.25 mm; the radius of curvature $r_2$ of the thinnest portion near the joint face 18g that extended from the inclined rear surface which was assumed to have a planar shape at the end connecting to an adjacent light guide plate unit was 15 mm.

The diffusion film was designed to have a haze of 87.6% and a total ray transmittance of 87.3%.

The prism sheet 16 consisted of a 400-μm thick PET base on which prisms were formed at a pitch of 100 μm with a vertex angle of 90 degrees. The reflector 20 was formed integral with the reflective film 22, which was a 180-μm thick grade of WHITE REFSTAR (product of Mitsui Chemicals, consisting of a polypropylene base film having mixed therein an inorganic filler and voids).

The first transmittance adjusters 26 were arranged at the pattern density shown in FIG. 4 to prepare the first transmittance adjusting member 28.

An acrylic film 0.18 mm thick was prepared as the transparent film 29 and a predetermined pattern was screen printed in $TiO_2$ screen ink to prepare the first transmittance adjusting member 28. The dot area and size for pattern printing were 50% and 300 μm (60 lines), respectively.

There was used JUJO INK RAYCURE 4707M High-Density White as the screen ink. A 1:1 (by weight) mixture of JUJO INK RAYCURE 4746M Indigo and TEIKOKU INK UV FIL-135TC Magenta was used as the color adjusting ink. MESH 355 of PriMax was used as the printing plate.

Described below are details about the method of calculating the pattern density of the first transmittance adjusters 26 in the first transmittance adjusting member 28.

To calculate the pattern density $\rho 1(x1,y1)$ for the first transmittance adjusting member 28 that would satisfy Equation 1, there was used a backlight unit having the same structure and shape as shown in FIG. 1, except that it was not furnished with the transmittance adjuster unit 24 (i.e. the first transmittance adjusting member 28 and the second transmittance adjusting member 30) and that it used only one light guide plate block, and there was measured the relative brightness $F1(x1,y1)$ of the light emitted from the light exit surface of this backlight unit.

Here the relative brightness $F1(x1,y1)$ was measured in the following manner.

First, the backlight unit was fixed on an XY stage and a brightness meter was fixed normal to the light exit surface of this backlight unit. Then, the brightness at a given position on the light exit surface of the backlight unit was measured with the brightness meter to get information on brightness at the specific position on the light exit surface of a light guide plate unit.

Figure 5:
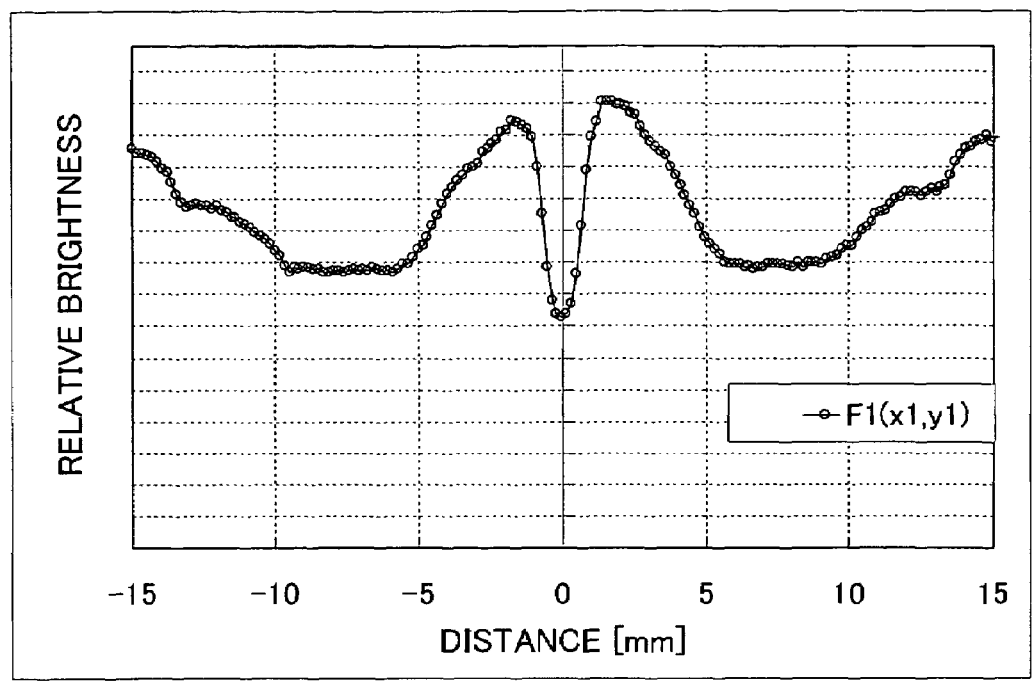
FIG. 5 is a graph showing the relative brightness of light emitted from the light exit surface of a backlight unit without the transmittance adjuster unit.

Subsequently, by moving the XY stage, brightness data was determined as a function of the position on the light exit surface of the backlight unit. The maximum brightness calculated is written as $F1_{max}$, and the minimum brightness as $F1_{min}$. With the maximum brightness $F1_{max}$ taken as unity, the brightness at a particular position relative to the maximum brightness $F1_{max}$ is expressed as the relative brightness $F1(x1, y1)$ at the position $(x1,y1)$. The results obtained by this measurement are shown in FIG. 5. The vertical axis of the graph in FIG. 5 plots the relative brightness and the horizontal axis plots the distance from the center of the light guide plate (the center of the parallel groove).

In the next step, the measured values of maximum brightness $F1_{max}$ and minimum brightness $F1_{min}$ were substituted into Equation 1 to calculate the pattern density $\rho 1(x1,y1)$ corresponding to the relative brightness $F1(x1,y1)$. In the example under consideration, the relation between the relative brightness $F1(x1,y1)$ and the pattern density $\rho 1(x1,y1)$ was calculated for four cases where the maximum density $c_1$ was adjusted to 0.25, 0.5, 0.75 and 1.0, respectively. The results of calculation are shown in FIG. 6 by plotting the pattern density $\rho 1(x1,y1)$ on the vertical axis and the relative brightness $F1(x1,y1)$ on the horizontal axis.

Figure 6:
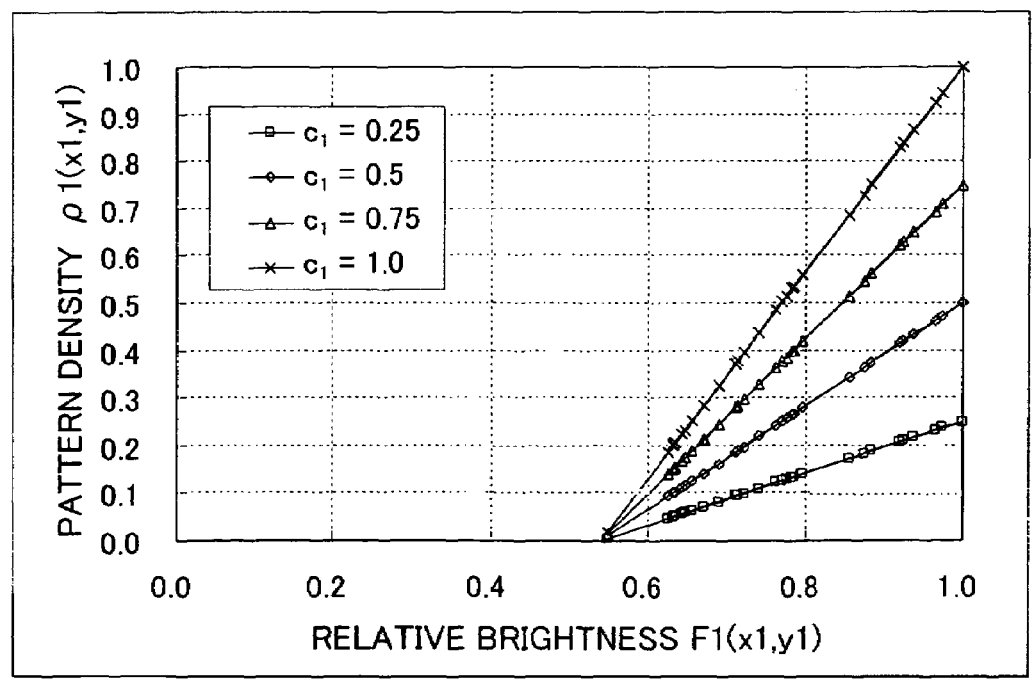
FIG. 6 is a graph showing the relation between the relative brightness calculated from FIG. 5 and pattern density.

As is clear from FIG. 6, the relationship between the relative brightness $F1(x1,y1)$ and the pattern density $\rho 1(x1,y1)$ is linear such that the pattern density $\rho 1(x1,y1)$ assumes zero when the relative brightness $F1(x1,y1)$ is at the minimum value $F1_{min}$, and assumes a maximum value $c_1$ when it is at the maximum value $F1_{max}$.

Figure 7:
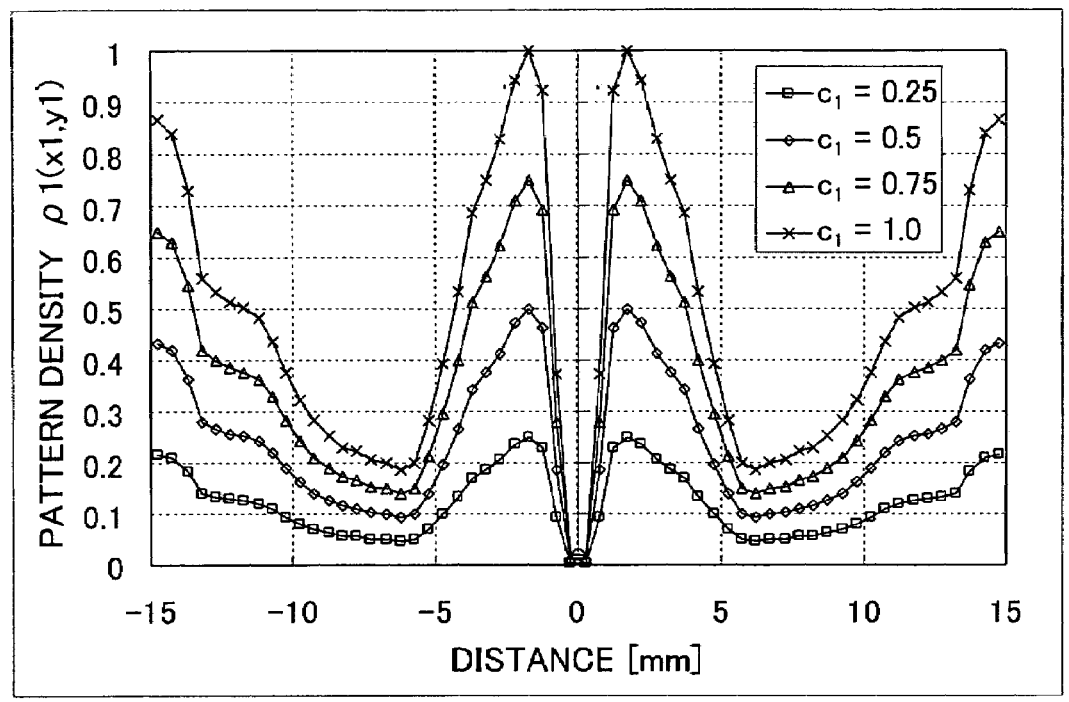
FIG. 7 is a graph showing the results of calculating the distributions of pattern density of the transmittance adjuster unit that satisfies the present invention when the maximum density $c_1$ is set at 0.25, 0.5, 0.75 and 1.0 based on the relative brightness values calculated from FIG. 5.

Then, on the basis of the relation between the relative brightness $F1(x1,y1)$ and the pattern density $\rho 1(x1,y1)$ that is depicted in FIG. 6, calculation was made to see how the pattern density $\rho 1(x1,y1)$ for a given relative brightness $F1(x1,y1)$ would be distributed in the backlight unit of the example under consideration which is shown in FIG. 5. The results are show in FIG. 7 as the distribution of the pattern density $\rho 1(x1,y1)$ calculated for four cases where the maximum density $c_1$ was adjusted to 0.25, 0.5, 0.75 and 1.0, respectively. In FIG. 7, the vertical axis plots the pattern density $\rho 1(x1,y1)$ and the horizontal axis plots the distance from the center of the light guide plate unit (the center of the parallel groove).

In the next step, on the basis of the distribution of the pattern density $\rho 1(x1,y1)$ that satisfied Equation 1 for four different cases where the maximum density c1 was adjusted to 0.25, 0.5, 0.75 and 1.0, the first transmittance adjusters 26 were arranged to prepare four samples of the first transmittance adjusting member 28.

In the example under consideration, the distribution of the pattern density $\rho(x,y)$ was calculated for every 0.5 mm in the direction of width (transverse direction in FIG. 3A) and in accordance with the calculated pattern density $\rho(x,y)$, the first transmittance adjusters 26 whose size in the direction of width varied between 0 and 1 mm were appropriately arranged to prepare the first transmittance adjusting member 28. To be more specific, the dimensions $L_1$-$L_4$ and $w_1$-$w_4$ indicated in FIG. 4B for the first transmittance adjusting member were chosen at the following values: $L_1=L_4=1.0$ mm, $L_2=L_3=0.5$ mm, and $0$ mm$\leqq w \leqq 1$ mm. The first transmittance adjusters 26 were repeatedly arranged to prepare the first transmittance adjusting member 28.

The first transmittance adjusters 26 that were arranged in the example under consideration were prepared in a white ink that would show a transmittance of 33% at a wavelength of 550 nm when they were arranged throughout, namely, at the pattern density $\rho 1(x1,y1)$ of unity.

Figure 8:
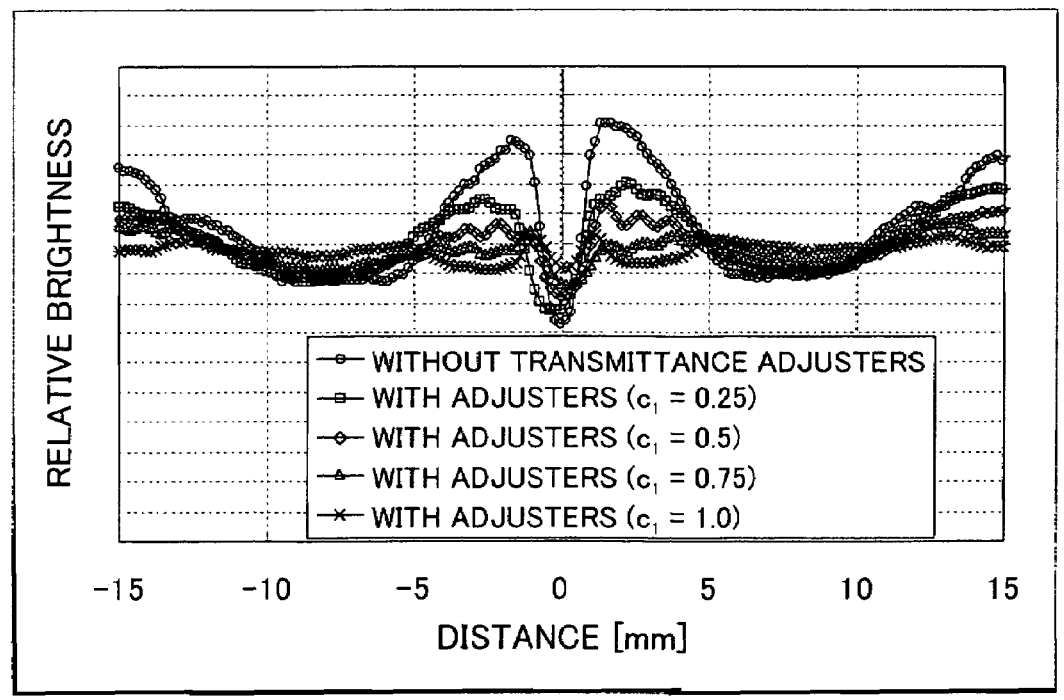
FIG. 8 is a graph showing the relative brightness of light emitted from the light exit surface of a planar lighting device furnished with the transmittance adjuster unit when the maximum density $c_1$ as calculated from FIG. 7 is set at 0.25, 0.5, 0.75 and 1.0.

The four samples thus prepared of the first transmittance adjusting member 28 were assembled in backlight units and the relative brightness of the light emitted from the light exit surface of each backlight unit was measured. The method of measurement was the same as was used to measure the above-described relative brightness $F1(x1,y1)$. The results of the measurement are shown in FIG. 8, in which the vertical axis plots the relative brightness and the horizontal axis plots the distance from the center of the light guide plate (the center of the parallel groove). For comparison, FIG. 8 also shows the vertical brightness of the light emitted from the light exit surface of a backlight unit having the same structure as the backlight unit of FIG. 1, except that it was not furnished with the transmittance adjuster unit 24, i.e. it did not have the first transmittance adjusting member 28 or the second transmittance adjusting member 30.

It can be seen from FIG. 8 that by providing the first transmittance adjusting member 28, unevenness in brightness could be made smaller than when neither the first transmittance adjusting member 28 nor the second transmittance adjusting member 30 was provided.

The results also show that in order to reduce the unevenness in brightness to ±10%, one only needs to adjust the maximum density $c_1$ to be within the range of $0.5 \leqq c_1 \leqq 1$.

Subsequently, the second transmittance adjusting member 30 was prepared in the following manner.

As in the case of the first transmittance adjusting member 28, a 0.18-mm thick acrylic film was prepared as the transparent film 34. Then, a predetermined pattern was screen printed in TiO$_2$ screen ink to prepare the second transmittance adjusting member 30. The dot area and size for pattern printing were 50% and 300 μm (60 lines), respectively. MESH 355 of PriMax was used as the printing plate.

Described below are details about the method of calculating the pattern density of the second transmittance adjusters 34 in the second transmittance adjusting member 30.

Figure 9:
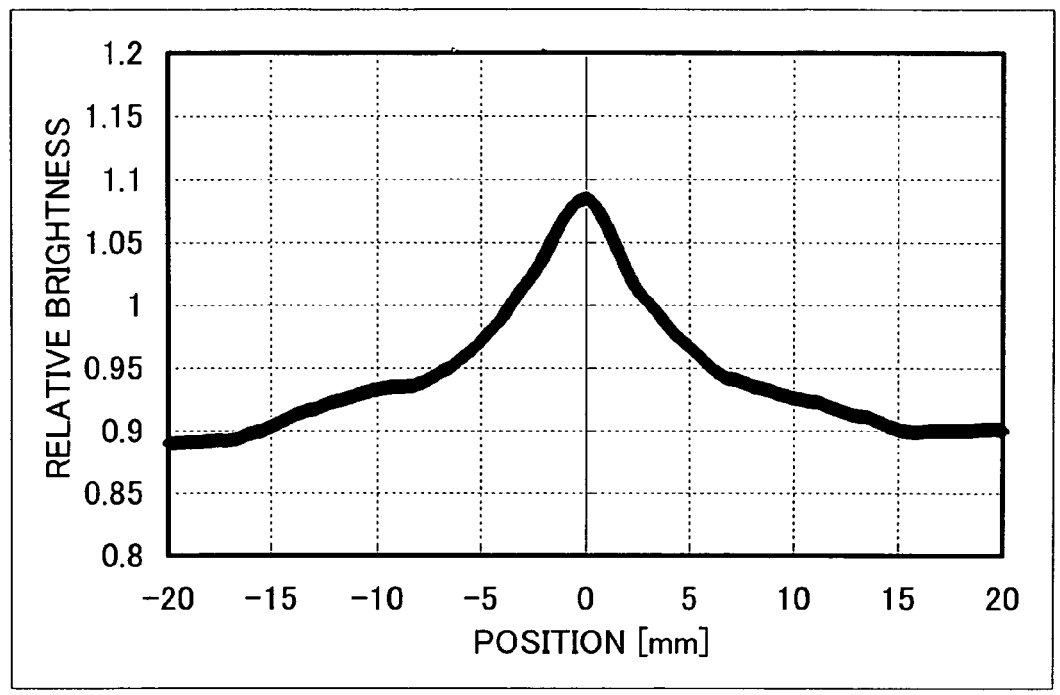
FIG. 9 shows the brightness distribution on the light exit surface of a backlight unit in a region that corresponds to the joint between adjacent light guide plate blocks.

A backlight unit was first prepared that had the same structure as the backlight unit shown in FIG. 1, except that it was not furnished with the second transmittance adjusting member. Then, the relative brightness of the illuminating light emitted from the light exit surface of this backlight unit was measured by the same method as described above for the first transmittance adjusting member 28. FIG. 9 shows the brightness distribution on the light exit surface of the backlight unit in a region that corresponds to the joint between adjacent light guide plate blocks. In FIG. 9, the horizontal axis plots the distance from the joint between adjacent light guide plate blocks and the vertical axis plots the relative brightness. As one can see from FIG. 9, a bright line occurred in the position corresponding to the joint between adjacent light guide plates.

Figure 10:
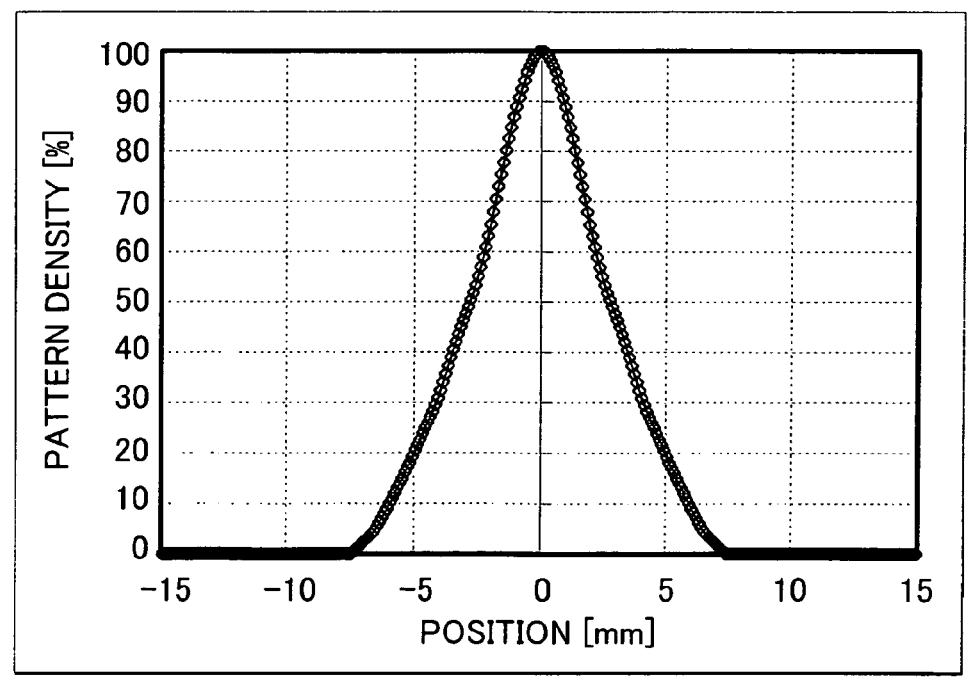
FIG. 10 shows the distribution of pattern density for the second transmittance adjusters 34 in a position that corresponds to the joint between adjacent light guide plate blocks.

Then, on the basis of the measured brightness distribution, the pattern density of the second transmittance adjusters was determined as in the above-described case of calculating the pattern density of the first transmittance adjusters. FIG. 10 shows the distribution of the pattern density of the second transmittance adjusters 32 in the position corresponding to the joint between adjacent light guide plate blocks. And on the basis of the thus determined distribution of pattern density, the second transmittance adjusters 32 were printed in respective positions corresponding to the joints between adjacent light guide plate blocks, thereby preparing the second transmittance adjusters 32.

Figure 11:
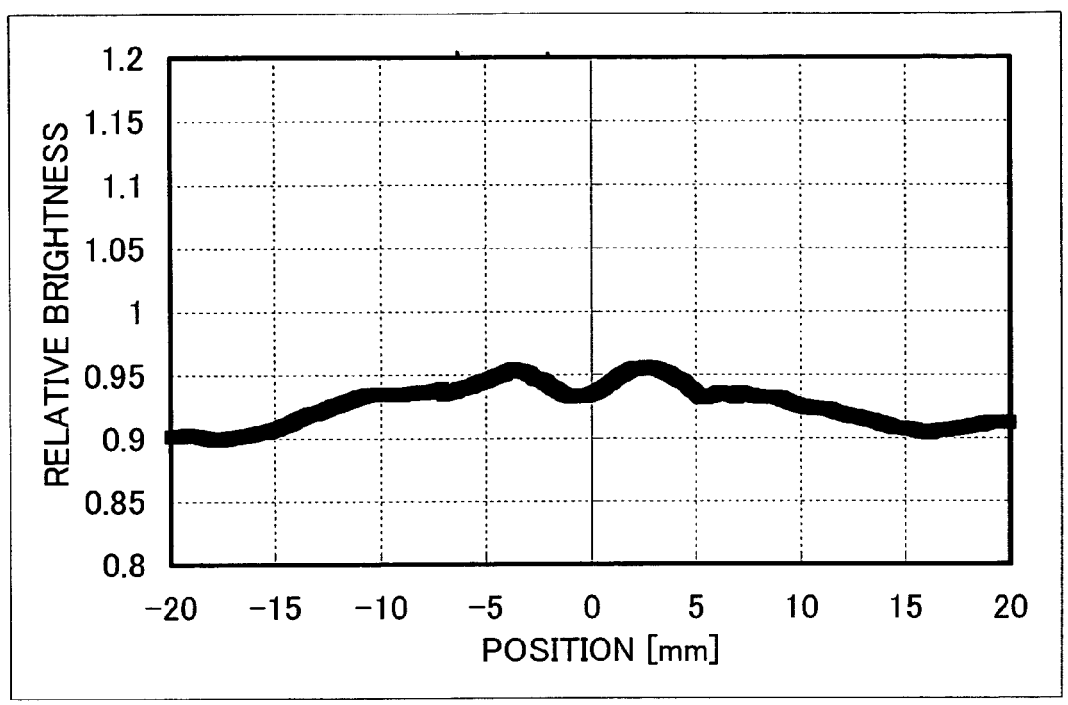
FIG. 11 shows the relative brightness distribution on the light exit surface of a backlight unit in a region that corresponds to the joint between adjacent light guide plate blocks, the backlight unit using the first and the second transmittance adjusting member.

Using the thus prepared first transmittance adjusting member 28 and the second transmittance adjusting member 30, a backlight unit having the structure shown in FIG. 1 was fabricated and the brightness distribution on the light exit surface of this backlight unit was measured. FIG. 11 shows the relative brightness distribution on the light exit surface of this backlight unit in positions that correspond to the joints between adjacent light guide plate blocks. In FIG. 11, the horizontal axis plots the distance from the joint between adjacent light guide plate blocks and the vertical axis plots the relative brightness. As one can see from FIG. 11, no bright line was perceived in a position that corresponded to the joint between adjacent light guide blocks and satisfactory uniformity in brightness was attained.

By combining this backlight unit with a liquid crystal display panel, there could be produced a flat-screen, lightweight liquid crystal display device capable of good image quality. While an example of the backlight unit of the present invention has been described above in detail, it should be noted that the present invention is by no means limited to that particular example.

Figure 12:
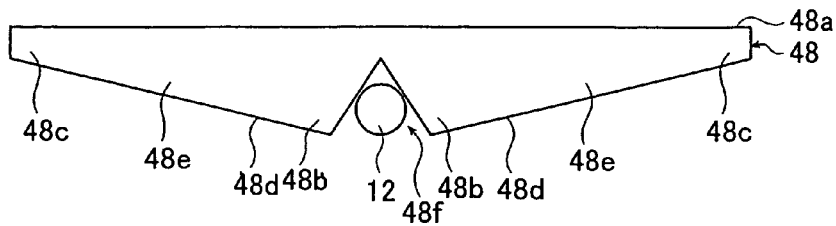
FIG. 12 is a schematic sectional view of a light guide plate with its inclined rear surface being made flat.

In the foregoing embodiment and example, an end portion of each inclined rear surface of the light guide plate is partly formed of a curved surface; however, the shape of the light guide plate is not limited in any particular way and as shown in FIG. 12, an end portion of the inclined rear surface 48d may also be formed of a flat surface. To be more specific, one may employ a light guide plate generally indicated by 48 in FIG. 12 which comprises a rectangular light exit surface 48a, a thick-walled portion 48b positioned at substantially a central portion of the rectangular light exit surface 48a in parallel with one of its sides, thin-walled edge portions 48c formed in parallel on both sides of the thick-walled portion 48b, a parallel groove 48f which accommodates a rod of light source 12 and is formed at substantially a center of the thick-walled portion 48b in parallel with said one of its sides, and inclined rear portions 48e which are symmetrical with respect to a plane including a central axis of the rod of light source 12 and perpendicular to the rectangular light exit surface 48a, and whose thickness is reduced from the thick-walled portion 48b toward the thin-walled edge portions 48e in a direction perpendicular to said one of its sides to thereby form inclined rear surfaces 48d on both sides of the parallel groove 48f. Even if the light guide plate 48 of such a shape is employed, the emitted light is rendered to have a smaller degree of unevenness in brightness, so it is possible to provide a backlight unit with less unevenness in brightness.

Figure 13:
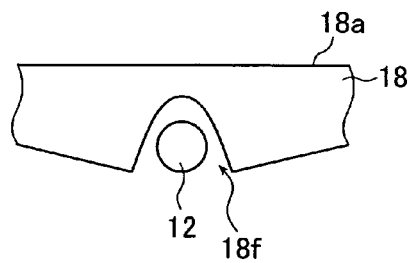
FIG. 13 is a schematic sectional view of a light guide plate in the case where a section taken along a direction perpendicular to the longitudinal direction of a parallel groove has a hyperbolic shape.
Figure 14:
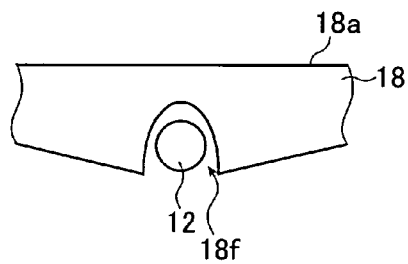
FIG. 14 is a schematic sectional view of a light guide plate in the case where a section taken along a direction perpendicular to the longitudinal direction of a parallel groove has an elliptical shape.

In the foregoing embodiment, the sectional shape of the parallel groove 18f in the light guide plate unit 18 is triangular, but in the present invention, the parallel groove 18f may have any sectional shape that is symmetrical with respect to a center line passing through the deepest portion or center of the parallel groove 18f and extending vertically with respect to the light exit surface 18a of the light guide plate unit 18, and is narrowed or tapered toward the light exit surface 18a. For example, as shown in FIGS. 13 and 14, a hyperbolic or elliptical sectional shape may be adopted. Alternatively, the parallel groove 18f of the light guide plate unit 18 may have a catenarian sectional shape.

Further, in the present invention, the parallel groove may have such a sectional shape that the deepest portion of the parallel groove (joint of sidewalls constituting the parallel groove) forms an intersection. More specifically, the parallel groove can take a sectional shape in its end portion, which is defined by part of two curved or straight lines crossing at an intersection as a peak, these lines being symmetrical with respect to the center line passing trough the center of the parallel groove and extending vertically with respect to the light exit surface of the light guide plate. In the present invention, the parallel groove of the light guide plate having any of the above sectional shapes allows the light emitted from the light exit surface of the light guide plate to be made even.

Figure 15:
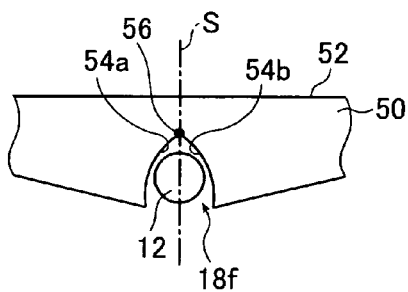
FIG. 15 is a schematic sectional view of a light guide plate where a sectional shape along a direction perpendicular to the longitudinal direction of a parallel groove is defined by a part of two arcs symmetrical with respect to a center line passing through the center of the parallel groove and extending vertically with respect to a light exit surface of the light guide plate.

FIG. 15 shows a case where the parallel groove 18f takes the sectional shape at its end portion, which is defined by part of two curved lines crossing at an intersection as a peak, these lines being symmetrical with respect to the center line passing trough the center of the parallel groove 18f and extending vertically with respect to the light exit surface of the light guide plate. In a light guide plate 50 shown in FIG. 15, there are used two arcs 54a and 54b that are symmetrical with respect to the center line X passing through the center of the parallel groove and extending vertically with respect to a light exit surface 52 of the light guide plate 50. In this case, as shown in FIG. 15, the center of the arc 54a corresponding to one sidewall forming the parallel groove 18f and that of the arc 54b corresponding to the other sidewall are not located at the same position. Consequently, a point 56 where the two arc-shaped sidewalls intersect each other forms an intersection as shown in FIG. 15.

Figure 16:
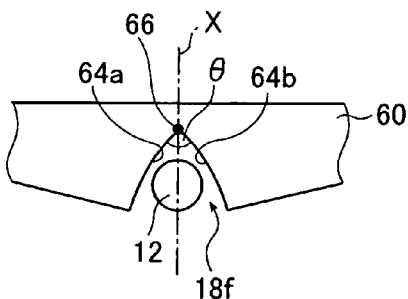
FIG. 16 is a schematic sectional view of a light guide plate where a sectional shape along a direction perpendicular to the longitudinal direction of a parallel groove is defined by a part of two parabolic curved lines symmetrical with respect to a center line passing through the center of the parallel groove and extending vertically with respect to a light exit surface of the light guide plate.

Further, FIG. 16 shows another case where the parallel groove 18f takes the sectional shape at its end portion, which is defined by part of two curved lines crossing at an intersection as a peak, these lines being symmetrical with respect to the center line passing trough the center of the parallel groove 18f and extending vertically with respect to the light exit surface of the light guide plate. In a light guide plate 60 shown in FIG. 16, there are used two parabolic curved lines 64a and 64b that are symmetrical with respect to the center line X passing through the center of the parallel groove 18f and extending vertically with respect to the light exit surface of the light guide plate. In FIG. 16, the sidewalls of the parallel groove 18f are formed in such a way that the focus of the curved line 64a corresponding to one sidewall forming the parallel groove 18f and that of the curved line 64b corresponding to the other sidewall 22b are not located at the same position.

As shown in FIG. 16, when the parallel groove has a sectional shape at its end portion, which is defined by the two curved lines 64a and 64b crossing at an intersection 66, an angle θ between the tangent at the intersection (peak) 66 of the curved line 64a corresponding to one sidewall of the parallel groove 18f and the tangent at the intersection 66 of the curved line 64b corresponding to the other sidewall is preferably 90 degrees or less, more preferably 60 degrees or less.

Figure 17:
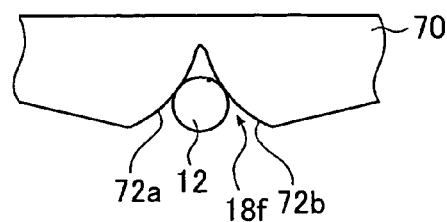
FIG. 17 is a schematic sectional view of a light guide plate where a sectional shape along a direction perpendicular to the longitudinal direction of a parallel groove is defined by two curved lines that are convex with respect to the center of the parallel groove.
Figure 18:
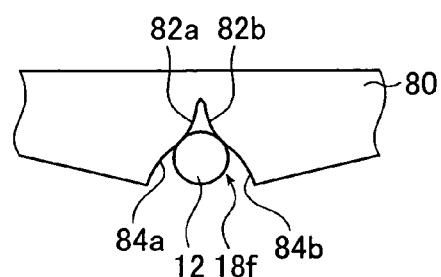
FIG. 18 is a schematic sectional view of a light guide plate where a sectional shape along a direction perpendicular to the longitudinal direction of a parallel groove is defined by a combination of two curved lines, one being convex and the other concave with respect to the center of the parallel groove.

While FIGS. 1 to 16 show examples of the light guide plate where the curved lines forming the sidewalls of the parallel groove are concave with respect to the center of the parallel groove in the sectional shape of the parallel groove, other forms of the light guide plates of the present invention which are different from the light guide plates described above are shown in FIGS. 17 and 18. FIG. 17 shows a light guide plate 70 where the parallel groove 18f has a sectional shape defined by two curved lines 72a and 72b that are convex with respect to the center of the parallel groove 18f. FIG. 18 shows a light guide plate 80 where the parallel groove 18f has a sectional shape defined by a combination of convex curved lines 82a and 82b and concave curved lines 84a and 84b with respect to the center of the parallel groove 18f. The light guide plates 70 and 80 having the parallel grooves with the sectional shapes shown in FIGS. 17 and 18, respectively, also contribute to emitting light with sufficient illuminance from the light exit surface while suppressing generation of bright lines.

In this way, according to the present invention, in the sectional shape of the parallel groove of the light guide plate, portions corresponding to the parallel groove may be formed in a curved shape that is convex or concave with respect to the center of the parallel groove, or in a straight shape, or even a combination thereof may be used. Those curved lines are not limited to arcs of the illustrated example, but may be part of curved lines, for example, elliptical, parabolic, or hyperbolic curved lines that are convex or concave with respect to the center of the parallel groove. Further, in the present invention, any sectional shape may be adopted for the end portion of the parallel groove insofar as the end portion is narrowed or tapered as described below. For example, the curved lines forming the parallel groove may be part of curved lines, for example, circular, elliptical, parabolic, or hyperbolic curved lines that are convex or concave with respect to the center of the parallel groove. It is preferable to use curved lines that can be approximated by a tenth-order mathematical function.

The top (deepest portion) of the end portion of the parallel groove may be in a level shape as obtained by chamfering the top at the acute intersection so as to be symmetrical with respect to the centerline of the parallel groove. Not only a rounded circular shape but also elliptical, parabolic, and hyperbolic shapes are also applicable. Further, in addition to this, the top (deepest portion) of the end portion of the parallel groove may be sanded or sand-rubbed as mentioned above to thereby reduce the peak value of illuminance.

It should further be noted that illuminance and brightness can be treated in generally the same way on the surface of the light guide plate. Therefore, by similarly designing the light guide plate in terms of brightness to have the shapes described above, it should of course be possible to provide uniform brightness over the light exit surface of the light guide plate.

In the light guide plate to be used in the backlight unit (planar lighting device) of the present invention, it is preferred that the end portion of the parallel groove 18f in the light guide plate unit 18 is narrowed or tapered according to the ratio that the peak value of a bright line (peak value of illuminance) observed at a portion (first portion) corresponding to the parallel groove 18f in the light exit surface 18a of each light guide plate unit 18 has with respect to the average value of illuminance measured at a portion other than the parallel groove 18f, that is, a portion corresponding to the inclined rear surface 18d (second portion). To be specific, the degree to which the end portion of the parallel groove 18f in the light guide plate unit 18 is narrowed or tapered is preferably controlled according to that ratio. In this case, the ratio is preferably set at 3 or less, more preferably 2 or less.

This ratio is preferably set according to the thickness of the backlight unit 2 (distance between the light exit surface 18a of the light guide plate unit 18 and the first transmittance adjusting member 28 of the transmittance adjuster unit 24), the diffusion efficiency of the diffusion film 14 used in the backlight unit 2 or the number of diffusion films, or the diffusion efficiency of the prism sheets 16 and 23 or the number of the prism sheets used. That is, in the case where the thickness of the backlight unit 2 (distance between the light exit surface 18a of the light guide plate 18 and the first transmittance adjusting member 28 of the transmittance adjuster unit 24) can be increased to some extent, or in the case where the diffusion efficiency of the diffusion film 14 used in the backlight unit 2 is so high that more diffusion films can be used, or in the case where the diffusion efficiency of the prism sheets 16 and 23 is so high that more prism sheets can be used, diffusing (mixing etc.) of illumination light emitted from the light exit surface 18a of the light guide plate unit 18 can be sufficiently carried out; hence, notwithstanding the inevitable higher cost, the ratio of the peak value of illuminance at the first portion of the light exit surface 18a of the light guide plate unit 18 to the average value of illuminance at the second portion of the light exit surface 18a of the light guide plate unit 18 can be set at a fairly large value; in the other cases, cost reduction is possible but the ratio needs to be set small.

In the light guide plate which is to be used in the planar lighting device of the present invention, the end portion of the parallel groove 18f in the light guide plate unit 18 is narrowed or tapered such that the peak value of the illuminance at the first portion of the light exit surface 18a of the light guide plate unit 18 is not more than three times, preferably not more than twice as large as the average value of the illuminance at the second portion of the light exit surface 18a of the light guide plate unit 18. Here, by setting the peak value of the illuminance at the first portion of the light exit surface 18a of the light guide plate unit 18 to be not more than three times as large as the average value of the illuminance at the second portion of the light exit surface 18a of the light guide plate unit 18, the illuminance distribution of the illumination light emitted from the light exit surface 18a of the light guide plate unit 18 can be made more uniform than in the prior art.

As a result, the illumination light emitted from the light exit surface 18a of the light guide plate unit 18 need not be diffused (e.g. mixed) to a considerable extent.

By adopting such a light guide plate, the planar lighting device of the present invention permits the use of an inexpensive diffusion film 14 having no markedly high diffusion efficiency and it also reduces the number of diffusion films that must be used. Besides, the expensive prism sheets 16 and 23 can be dispensed with; alternatively, inexpensive prism sheets 16 and 23 having no markedly high diffusion efficiency can be used or fewer prism sheets need to be used. As a result, an even lighter and less expensive backlight unit can be provided.

In the light guide plate to be used in the backlight unit of the present invention, the end portion of the parallel groove 18f in the light guide plate unit 18 which is to be narrowed or tapered is preferably such that it forms, in its sectional shape, an angle not greater than 90 degrees, more preferably no greater than 60 degrees, the angle being the combination of two angles on opposite sides of the normal line extending from the center of the light source 12 in rod shape toward the light exit surface 18a. More specifically, in the present invention, a portion of the parallel groove 18f is narrowed or tapered in order to reduce the peak value of the illuminance at the first portion of the light exit surface 18a of the light guide plate unit 18 which corresponds to the parallel groove 18f and this may be the entire part of the parallel groove 18f. However, only a selected part of the end portion may be narrowed or tapered insofar as the peak value of illuminance can be reduced.

In order to form a larger light guide plate by connecting a plurality of light guide plate units, thin-walled portions of separately molded light guide plate units may be connected together; alternatively, from the viewpoint of production efficiency, as many light guide plate units as are necessary to form a light guide plate comparable to the required screen size may be molded monolithically.

Figure 19:
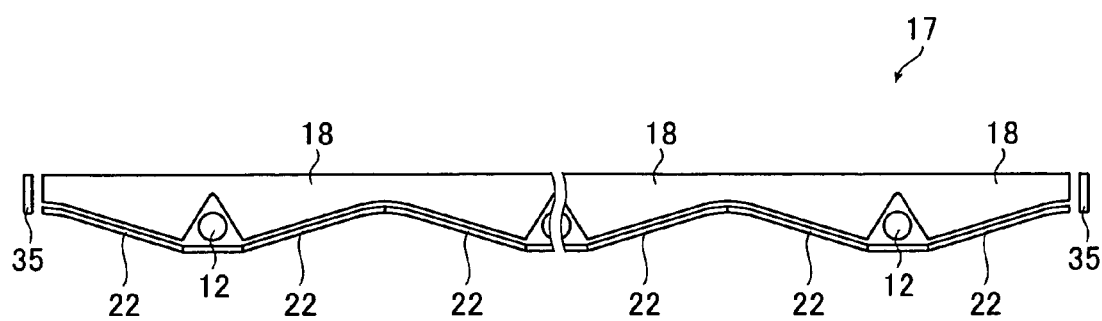
FIG. 19 is a schematic view showing part of a planar lighting device having reflective plates provided on lateral sides of the light guide plates.
Figure 20:
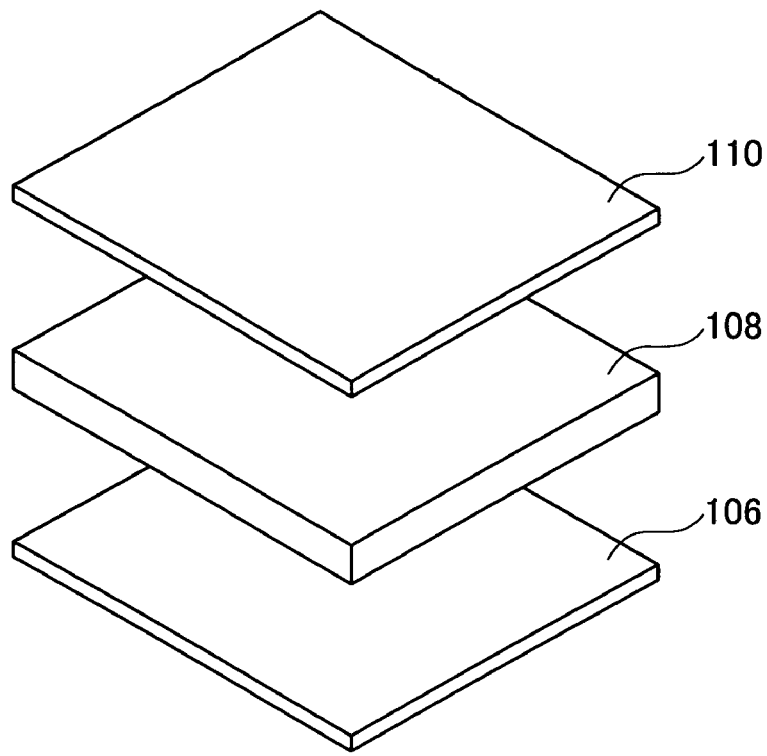
FIG. 20 is an exploded perspective view of an area light source device having a conventional light guide plate.
Figure 20:
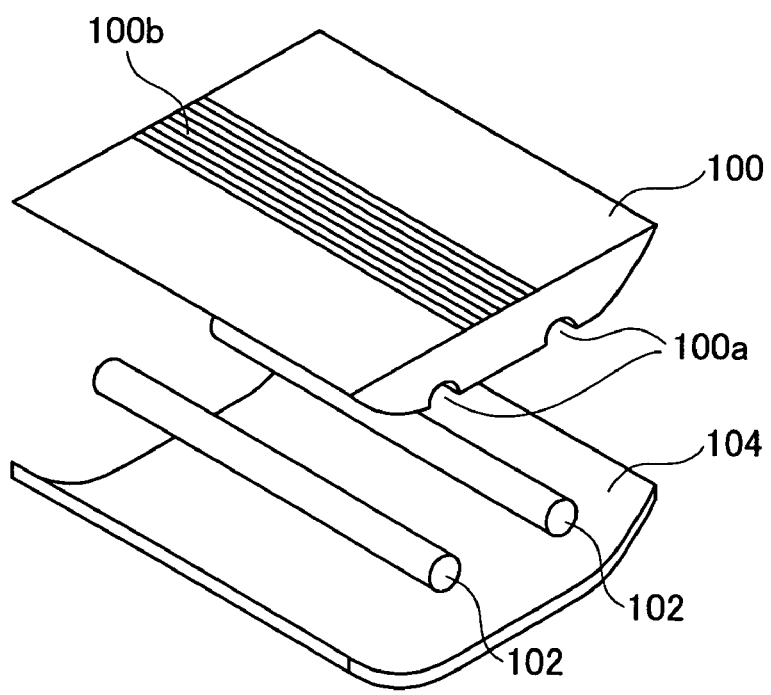

Another possible embodiment of the backlight unit of the present invention is shown in FIG. 19, where a reflector plate 35 is provided on a lateral side of each of the light guide plate blocks 17 that are positioned on the outermost side. Those reflector plates 35 effectively prevent the leakage of light from the lateral sides of the outermost light guide plate blocks 17, thereby contributing to an even higher utilization of light. It should be noted here that the reflector plates 35 may be formed of the same material as used to make the aforementioned reflective sheet or reflector.

The transmittance adjuster unit to be employed in the present invention is by no means limited to the shapes described on the foregoing pages and it may be applied in backlight units and liquid crystal display devices that employ various shapes of light guide plates including a tandem type.

While the diffusion film of the present invention, as well as the backlight unit and liquid crystal display device that are provided with this diffusion film have been described above in detail, the present invention is by no means limited to the above embodiments and various improvements and changes may of course be made without departing from the gist of the present invention.

What is claimed is:

1. A planar lighting device, comprising:
    rod type light sources;
    a light guide plate comprising light guide plate blocks that are arranged side by side and each of which is formed of an integral assembly of at least two tabular light guide plate units each having a rear surface with a groove formed to accommodate a rod type light source and a light exit surface that is away from said rear surface and which is for emitting the light from said rod type light source; and
    a transmittance adjuster unit that is provided on a side closer to said light exit surface of said light guide plate, which diffuses the light emitted from said light exit surface of said light guide plate and emits the thus diffused light and which has a sheet type optical member capable of transmitting light and transmittance adjusters provided on at least one surface of said sheet type optical member,
    wherein said transmittance adjusters in said transmittance adjuster unit at a position corresponding to a seam between adjacent light guide plate blocks are distributed at a different density than said transmittance adjusters in said transmittance adjuster unit at a position corresponding to a joint between adjacent light guide plate units.

2. The planar lighting device according to claim 1, wherein a density of said transmittance adjusters in said transmittance adjuster unit at said position corresponding to said seam between adjacent light guide plate blocks is higher than a density of said transmittance adjusters in said transmittance adjuster unit at said position corresponding to said joint between adjacent light guide plate units.

3. The planar lighting device according to claim 1, wherein if a pattern density of said transmittance adjusters in said transmittance adjuster unit at a specified position (x,y) in a region corresponding to said light guide plate blocks is denoted as $\rho(x,y)$, a maximum brightness $F_{max}$ of illuminating light that is obtained when said planar lighting device is not furnished with said transmittance adjuster unit is assumed to be unity, and a relative brightness with respect to said maximum brightness $F_{max}$ of illuminating light that is emitted from said specified position (x,y) is denoted as $F(x,y)$, then said relative brightness $F(x,y)$ and said pattern density $\rho(x,y)$ satisfy either of the following relations:

$$\rho(x,y)=c\{F(x,y)-F_{min}\}/(F_{max}-F_{min})$$

where c satisfies $0.5 \leq c \leq 1$ and $F_{min}$ is a minimum value of said relative brightness $F(x,y)$.

4. The planar lighting device according to claim 1, wherein if a pattern density of said transmittance adjusters in said transmittance adjuster unit at a specified position (x,y) in a region corresponding to said light guide plate blocks is denoted as $\rho(x,y)$, a maximum brightness $F_{max}$ of illuminating light that is obtained when said planar lighting device is not furnished with said transmittance adjuster unit is assumed to be unity, and a relative brightness with respect to said maximum brightness $F_{max}$ of illuminating light that is emitted from said specified position (x,y) is denoted as $F(x,y)$, then said relative brightness $F(x,y)$ and said pattern density $\rho(x,y)$ satisfy either of the following relations:

$$\rho(x,y)=c\{F(x,y)-F_{min}\}/(F_{max}-F_{min})+\rho_b$$

where c satisfies $0.5 \leq c \leq 1$, $\rho_b$ satisfies $0 \leq \rho_b \leq 1.5$, and $F_{min}$ is a minimum value of the relative brightness $F(x,y)$.

5. The planar lighting device according to claim 1, wherein if a pattern density of said transmittance adjusters in said transmittance adjuster unit at a specified position (x,y) in a region corresponding to said light guide plate blocks is denoted as $\rho(x,y)$, a maximum brightness $F_{max}$ of illuminating light that is obtained when said planar lighting device is not furnished with said transmittance adjuster unit is assumed to be unity, and a relative brightness with respect to said maximum brightness $F_{max}$ of illuminating light that is emitted from said specified position (x,y) is denoted as $F(x,y)$, then said relative brightness $F(x,y)$ and said pattern density $\rho(x,y)$ satisfy either of the following relations:

$$\rho(x,y)=c\{F(x,y)-F_{min}\}/(F_{max}-F_{min})+\rho_b$$

where c satisfies $0 < c \leq 0.3$, $\rho_b$ satisfies $0.5 \leq \rho_b$, and $F_{min}$ is a minimum value of the relative brightness $F(x,y)$.

6. A planar lighting device, comprising:
    rod type light sources;
    a light guide plate comprising light guide plate blocks that are arranged side by side and each of which is formed of an integral assembly of at least two tabular light guide plate units each having a rear surface with a groove formed to accommodate a rod type light source and a light exit surface that is away from said rear surface and which is for emitting the light from said rod type light source; and a transmittance adjuster unit that is provided on a side closer to said light exit surface of said light guide plate and which comprises a first transmittance adjusting member having a first sheet type optical member capable of transmitting light and first transmittance adjusters provided on at least one surface of said first sheet type optical member and a second transmittance adjusting member having a second sheet type optical member capable of transmitting light and second transmittance adjusters provided on at least one surface of said first sheet type optical member in a position corresponding to a seam between adjacent light guide plate blocks, wherein said second transmittance adjusters are distributed at a different density than said first transmittance adjusters in a position corresponding to a joint between adjacent light guide plate units.

7. The planar lighting device according to claim 6, wherein a density of said second transmittance adjusters is higher than a density of said first transmittance adjusters at said position corresponding to said joint between adjacent light guide plate units.

8. The planar lighting device according to claim 6, wherein if a pattern density of said first transmittance adjusters in a specified position (x1,y1) is denoted as $\rho 1(x1,y1)$, a maximum brightness $F1_{max}$ of illuminating light that is obtained when said planar lighting device is not furnished with said transmittance adjuster unit is assumed to be unity, and a relative brightness with respect to said maximum brightness $F1_{max}$ of illuminating light that is emitted from said specified position (x1,y1) is denoted as $F1(x1,y1)$, then said relative brightness $F1(x1,y1)$ and said pattern density $\rho 1(x1,y1)$ satisfy either of the following relations:

$$\rho 1(x1,y1)=c_1\{F1(x1,y1)-F1_{min}\}/(F1_{max}-F1_{min})$$

where $c_1$ satisfies $0.5 \leq c_1 \leq 1$ and $F1_{min}$ is a minimum value of said relative brightness $F1(x1,y1)$.

9. The planar lighting device according to claim 6, wherein if a pattern density of said first transmittance adjusters in a specified position (x1,y1) is denoted as $\rho 1(x1,y1)$, a maximum brightness $F1_{max}$ of illuminating light that is obtained when said planar lighting device is not furnished with said transmittance adjuster unit is assumed to be unity, and a relative brightness with respect to said maximum brightness $F1_{max}$ of illuminating light that is emitted from said specified position (x1,y1) is denoted as $F1(x1,y1)$, then said relative brightness $F1(x1,y1)$ and said pattern density $\rho 1(x1,y1)$ satisfy either of the following relations:

$$\rho 1(x1,y1)=c_1\{F(x1,y1)-F1_{min}\}/(F1_{max}-F1_{min})+\rho_b$$

where $c_1$ satisfies $0.5 \leq c_1 \leq 1$, $\rho_b$ satisfies $0 \leq \rho_b \leq 1.5$, and $F1_{min}$ is a minimum value of the relative brightness $F1(x1,y1)$.

10. The planar lighting device according to claim 6, wherein if a pattern density of said first transmittance adjusters in a specified position (x1,y1) is denoted as $\rho 1(x1,y1)$, a maximum brightness $F1_{max}$ of illuminating light that is obtained when said planar lighting device is not furnished with said transmittance adjuster unit is assumed to be unity, and a relative brightness with respect to said maximum brightness $F1_{max}$ of illuminating light that is emitted from said specified position (x1,y1) is denoted as $F1(x1,y1)$, then said relative brightness $F1(x1,y1)$ and said pattern density $\rho 1(x1,y1)$ satisfy either of the following relations:

$$\rho 1(x1,y1)=c_1\{F(x1,y1)-F1_{min}\}/(F1_{max}-F1_{min})+\rho_b$$

where c satisfies $0<c_1<0.3$, $\rho_b$ satisfies $0.5 \leq \rho_b$, and $F1_{min}$ is a minimum value of the relative brightness $F1(x1,y1)$.

11. The planar lighting device according to claim 6, wherein if a pattern density of said second transmittance adjusters in a specified position (x2,y2) is denoted as $\rho 2(x2,y2)$, a maximum brightness $F2_{max}$ of illuminating light that is emitted from said light exit surface of said transmittance adjuster unit when said planar lighting device is not furnished with said second transmittance adjusting member is assumed to be unity, and a relative brightness with respect to said maximum brightness $F2_{max}$ of illuminating light that is emitted from said specified position (x2,y2) is denoted as $F2(x2,y2)$, then said relative brightness $F2(x2,y2)$ and said pattern density $\rho 2(x2,y2)$ satisfy the following relation:

$$\rho 2(x2,y2)=c_2\{F2(x2,y2)-F2_{min}\}/(F2_{max}-F2_{min})$$

where $c_2$ satisfies $0.5 \leq c_2 \leq 1$ and $F2_{min}$ is a minimum value of said relative brightness $F2(x2,y2)$.

12. A liquid crystal display device, comprising:
a planar lighting device, comprising:
rod type light sources;
a light guide plate comprising light guide plate blocks that are arranged side by side and each of which is formed of an integral assembly of at least two tabular light guide plate units each having a rear surface with a groove formed to accommodate a rod type light source and a light exit surface that is away from said rear surface and which is for emitting the light from said rod type light source; and
a transmittance adjuster unit that is provided on a side closer to said light exit surface of said light guide plate, which diffuses the light emitted from said light exit surface of said light guide plate and emits the thus diffused light and which has a sheet type optical member capable of transmitting light and transmittance adjusters provided on at least one surface of said sheet type optical member,
wherein said transmittance adjusters in said transmittance adjuster unit at a position corresponding to a seam between adjacent light guide plate blocks are distributed at a different density than said transmittance adjusters in said transmittance adjuster unit at a position corresponding to a joint between adjacent light guide plate units;
a liquid crystal display panel provided on a side closer to said light exit surface of said planar lighting device; and
a drive unit for driving said liquid crystal display panel.

13. A liquid crystal display device, comprising:
a planar lighting device, comprising:
rod type light sources;
a light guide plate comprising light guide plate blocks that are arranged side by side and each of which is formed of an integral assembly of at least two tabular light guide plate units each having a rear surface with a groove formed to accommodate a rod type light source and a light exit surface that is away from said rear surface and which is for emitting the light from said rod type light source; and
a transmittance adjuster unit that is provided on a side closer to said light exit surface of said light guide plate and which comprises a first transmittance adjusting member having a first sheet type optical member capable of transmitting light and first transmittance adjusters provided on at least one surface of said first sheet type optical member and a second transmittance adjusting member having a second sheet type optical member capable of transmitting light and second transmittance adjusters provided on at least one surface of said first sheet type optical member in a position corresponding to a seam between adjacent light guide plate blocks, wherein said second transmittance adjusters are distributed at a different density than said first transmittance adjusters in a position corresponding to a joint between adjacent light guide plate units;

a liquid crystal display panel provided on a side closer to said light exit surface of said planar lighting device; and a drive unit for driving said liquid crystal display panel.

* * * * *